United States Patent
Li et al.

(10) Patent No.: US 12,242,071 B2
(45) Date of Patent: Mar. 4, 2025

(54) ELECTRONIC DEVICE AND IMAGE DISPLAY METHOD THEREOF

(71) Applicant: Huawei Technologies Co., Ltd., Shenzhen (CN)

(72) Inventors: Tengyue Li, Shenzhen (CN); Lulu Zhu, Dongguan (CN); Chunjing Mao, Shenzhen (CN); Guanyi Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/558,096

(22) PCT Filed: Apr. 6, 2022

(86) PCT No.: PCT/CN2022/085255
§ 371 (c)(1),
(2) Date: Oct. 30, 2023

(87) PCT Pub. No.: WO2022/228055
PCT Pub. Date: Nov. 3, 2022

(65) Prior Publication Data
US 2024/0219733 A1   Jul. 4, 2024

(30) Foreign Application Priority Data

Apr. 30, 2021 (CN) .......................... 202110481159.X

(51) Int. Cl.
*G02B 27/01* (2006.01)
*G02B 6/26* (2006.01)
(Continued)

(52) U.S. Cl.
CPC ......... *G02B 27/0172* (2013.01); *G02B 6/262* (2013.01); *G02B 26/0833* (2013.01);
(Continued)

(58) Field of Classification Search
CPC ................ G02B 26/08; G02B 26/0833; G02B 27/0172; G02B 6/262; G02B 2027/0123;
(Continued)

(56) References Cited

U.S. PATENT DOCUMENTS 11,036,272 B2 *  6/2021  Luo .......................... G06F 3/147
2007/0285570 A1  12/2007  Derosiers et al.
(Continued)

FOREIGN PATENT DOCUMENTS

CN        101505411 A    8/2009
CN        107797662 A    3/2018
(Continued)

*Primary Examiner* — Nelson M Rosario
(74) *Attorney, Agent, or Firm* — Conley Rose, P.C.

(57) ABSTRACT

In an image display method, images of different fields of view (FOVs) are displayed when power statuses of an electronic device are different. The power status includes a status of a connection to an external power supply device or a battery level status. The electronic device may display a small-FOV image when the electronic device is not connected to the external power supply device or a battery level of the electronic device is less than a first battery level. The electronic device may display a large-FOV image when the electronic device is connected to the external power supply device or the battery level of the electronic device is greater than or equal to the first battery level.

20 Claims, 20 Drawing Sheets

(51) Int. Cl.
*G02B 26/08* (2006.01)
*G09G 3/02* (2006.01)
*G09G 3/34* (2006.01)
*H02J 7/00* (2006.01)

(52) U.S. Cl.
CPC .............. *G09G 3/02* (2013.01); *G09G 3/3406* (2013.01); *H02J 7/0048* (2020.01); *G02B 2027/0123* (2013.01); *G02B 2027/0141* (2013.01); *G02B 2027/0178* (2013.01); *G09G 3/346* (2013.01); *G09G 2330/023* (2013.01); *G09G 2340/0407* (2013.01); *G09G 2340/045* (2013.01)

(58) Field of Classification Search
CPC .... G02B 2027/0141; G02B 2027/0178; G06F 3/14; G06F 3/147; G09G 3/02; G09G 3/3406; G09G 2320/0261; G09G 2330/021; G09G 2330/023; G09G 2340/0407; G09G 2340/045; G09G 2354/00; G09G 3/346; H02J 7/0048

See application file for complete search history.

(56) References Cited

U.S. PATENT DOCUMENTS

| | | | |
|---|---|---|---|
| 2014/0092140 A1* | 4/2014 | Wadhwa | G09G 3/20 345/660 |
| 2014/0189583 A1* | 7/2014 | Yang | G06F 3/04883 715/800 |
| 2018/0196512 A1 | 7/2018 | Kim et al. | |
| 2019/0122641 A1 | 4/2019 | Lin | |

FOREIGN PATENT DOCUMENTS

| | | |
|---|---|---|
| CN | 208111045 U | 11/2018 |
| CN | 210401842 U | 4/2020 |

* cited by examiner

S1710: Detect whether an electronic device is connected to an external power supply device S1720: Display a small-FOV image if the electronic device is not connected to the external power supply device

ELECTRONIC DEVICE AND IMAGE DISPLAY METHOD THEREOF

CROSS-REFERENCE TO RELATED APPLICATIONS

This is a U.S. National Stage of International Patent Application No. PCT/CN2022/085255, filed on Apr. 6, 2022, which claims priority to Chinese Patent Application No. 202110481159.X, filed on Apr. 30, 2021, which are incorporated by reference.

TECHNICAL FIELD

This application relates to the field of communication technologies, and in particular, to an electronic device and an image display method thereof.

BACKGROUND

A field of view (field of view, FOV) of a head-mounted electronic device determines a visual field of the head-mounted electronic device. Specifically, a larger field of view of the electronic device indicates a larger visual field, and a smaller field of view of the electronic device indicates a smaller visual field.

SUMMARY

This application provides an image display method and an electronic device, so that different FOVs can be displayed under different conditions, to meet requirements of a user under different conditions.

According to a first aspect, this application provides an image display method. The method is applied to an electronic device. The method includes: The electronic device displays images of different fields of view FOVs when power statuses of the electronic device are different. The power status includes a status of a connection between the electronic device and an external power supply device and/or a battery level status of the electronic device.

In some embodiments, an image of a first FOV is displayed when the electronic device is not connected to the external power supply device or a battery level of the electronic device is less than a first battery level. An image of a second FOV is displayed when the electronic device is connected to the external power supply device or the battery level of the electronic device is greater than or equal to the first battery level. The first FOV is less than the second FOV.

According to the foregoing image display method, a small-FOV image is displayed when the electronic device is not connected to the external power supply device. This can reduce energy consumption, prolong a working time of the electronic device, and improve user experience. When the electronic device is connected to the external power supply device, a large-FOV image is displayed. This can provide a better display effect for a user.

In this embodiment, when the battery level of the electronic device is less than the first battery level, the small-FOV image is displayed. This can reduce energy consumption, prolong the working time of the electronic device, and improve user experience. When the battery level of the electronic device is greater than or equal to the first battery level, the large-FOV image is displayed. This can provide a better display effect for a user.

In some embodiments, the electronic device displays an image of a first FOV when the electronic device is not connected to the external power supply device and a battery level of the electronic device is greater than or equal to a first battery level. The electronic device displays an image of a second FOV when the electronic device is connected to the external power supply device. The second FOV is greater than or equal to the first FOV. The electronic device displays an image of a third FOV when the electronic device is not connected to the external power supply device and the battery level of the electronic device is less than the first battery level. The third FOV is less than the first FOV.

In some embodiments, the electronic device includes an optical display module. The optical display module includes a laser beam scanning LBS optical engine. The LBS optical engine includes a micro-electro-mechanical system MEMS mirror. The electronic device displays the image of the first FOV when a maximum deflection angle of the MEMS mirror during vibrational rotation is a first angle. The electronic device displays the image of the second FOV when the maximum deflection angle of the MEMS mirror during the vibrational rotation is a second angle. The first angle is less than the second angle.

In this embodiment, when an FOV of the electronic device needs to be adjusted, the maximum deflection angle of the MEMS mirror may be adjusted. A maximum deflection angle (for example, the second angle) corresponding to a large FOV (for example, the second FOV) is greater than a maximum deflection angle (for example, the first angle) corresponding to a small FOV (for example, the first FOV).

It may be understood that the method for adjusting the FOV of the electronic device by adjusting the maximum rotation angle of the MEMS mirror is not limited to being applied to the foregoing scenarios of whether the electronic device is connected to the external power supply device and whether the battery level of the electronic device is less than a specific battery level. The method in this embodiment can be used in any other scenario in which the FOV needs to be switched.

In some embodiments, the optical display module further includes a laser module. The LBS optical engine further includes an optical waveguide. The optical waveguide includes an incoupling area and an outcoupling area. The laser module is configured to emit a beam to the MEMS mirror. The MEMS mirror is configured to make the beam emitted by the optical film module incident, and then emergent and incident to the incoupling area through vibrational rotation. The optical waveguide is configured to transmit, to the outcoupling area, the beam incident to the incoupling area, and make the beam emergent from the outcoupling area.

In some embodiments, the electronic device further includes a drive chip. The maximum deflection angle of the MEMS mirror may be adjusted by adjusting a magnitude of a voltage signal that is output by the drive chip of the MEMS mirror to the MEMS mirror. For example, when the drive chip outputs a first voltage signal to the MEMS mirror, the maximum deflection angle of the MEMS mirror is the first angle. When the drive chip outputs a second voltage signal to the MEMS mirror, the maximum deflection angle of the MEMS mirror is adjusted to the second angle. The first voltage signal is less than the second voltage signal.

In some embodiments, the electronic device includes an optical display module. The optical display module includes a display. The electronic device displays the image of the first FOV when an active area of the display is a first area. The electronic device displays the image of the second FOV when the active area of the display is a second area. The first area is smaller than the second area.

In this embodiment, when the FOV of the electronic device needs to be adjusted, a size of the active area of the display may be adjusted. An active area (for example, the second area) corresponding to the large FOV (for example, the second FOV) is larger than an active area (for example, the first area) corresponding to the small FOV (for example, the first FOV).

It may be understood that the method for adjusting the FOV of the electronic device by adjusting the active area of the display is not limited to being applied to the foregoing scenarios of whether the electronic device is connected to the external power supply device and whether the battery level of the electronic device is less than a specific battery level. The method in this embodiment can be used in any other scenario in which the FOV needs to be switched.

In some embodiments, the display is a self-luminous display. In this case, an active area of the self-luminous display may be adjusted by adjusting a resolution of the self-luminous display. For example, when the resolution of the self-luminous display is adjusted to a first resolution, the active area of the self-luminous display is the first area. When the resolution of the self-luminous display is adjusted to a second resolution, the active area of the display is the second area. The first resolution is lower than the second resolution.

In some embodiments, the optical display module further includes a first mirror group. The first mirror group includes one or more mirrors. The first mirror group is configured to make a beam emitted by the active area of the self-luminous display incident and then emergent.

In some embodiments, the display is a reflective display. The optical display module further includes a light source. The reflective display is configured to reflect light emitted by the light source. In this case, an active area of the reflective display may be adjusted by adjusting a light-emitting area of the light source. For example, when the light-emitting area of the light source is adjusted to a first light-emitting area, the active area of the reflective display is the first area. When the light-emitting area of the light source is adjusted to a second light-emitting area, the active area of the reflective display is the second area. The second reflection area is larger than the first light-emitting area.

In some embodiments, the optical display module further includes a first mirror group, a second mirror group, and an optical waveguide. The optical waveguide includes an incoupling area and an outcoupling area. The first mirror group and the second mirror group each include one or more mirrors. The first mirror group is configured to make a beam emitted by the light source incident, and then emergent and incident to the reflective display. The second mirror group is configured to make the beam incident to the reflective display incident, and then emergent and incident to the incoupling area. The optical waveguide is configured to transmit, to the outcoupling area, the beam incident to the incoupling area, and make the beam emergent from the outcoupling area.

In some embodiments, the electronic device is a head-mounted display device. In some embodiments, the image is a virtual image.

When the image displayed by the electronic device is a virtual image and the electronic device is the head-mounted display device, because the head-mounted display device includes a fastening component, the fastening component can fasten the head-mounted display device to the head of a user, so that a human eye pupil can be fastened to a position at which the virtual image displayed by the head-mounted display device is properly received. This can ensure that the virtual image can accurately enter the human eye pupil, and finally improve an image display effect of the electronic device.

According to a second aspect, this application provides an electronic device, including one or more processors and one or more memories. The one or more memories are coupled to the one or more processors. The one or more memories are configured to store computer program code. The computer program code includes computer instructions. When the one or more processors execute the computer instructions, the terminal performs the image display method according to any one of the first aspect or the possible implementations of the first aspect.

According to a third aspect, this application provides a computer-readable storage medium, including computer instructions. When the computer instructions are run on a terminal, the terminal is enabled to perform the image display method according to any one of the first aspect or the possible implementations of the first aspect.

According to a fourth aspect, this application provides a computer program product. The computer program product includes computer program code. When the computer program code is run on a computer, the computer is enabled to implement the image display method according to any one of the first aspect or the possible implementations of the first aspect.

DESCRIPTION OF EMBODIMENTS

To better describe embodiments of this application, the following describes some terms in embodiments of this application. It may be understood that these descriptions are intended to help readers better understand the technical solutions of this application, but not to limit this application.

An electronic device in embodiments of this application may be any device including a display, for example, may be a head-mounted electronic device. The head-mounted electronic device may implement different effects such as virtual reality (virtual reality, VR), augmented reality (augmented reality, AR), and mixed reality (mixed reality, MR). An example of the head-mounted electronic device may be VR glasses, AR glasses, MR glasses, goggles, or the like. Alternatively, the electronic device may be a mobile phone, a vehicle-mounted device, a computer, a notebook computer, or the like.

In subsequent embodiments of this application, an example in which the electronic device is the head-mounted electronic device is used for description. However, the electronic device in embodiments of this application is not limited to the head-mounted electronic device, and may alternatively be another device.

Figure 1:
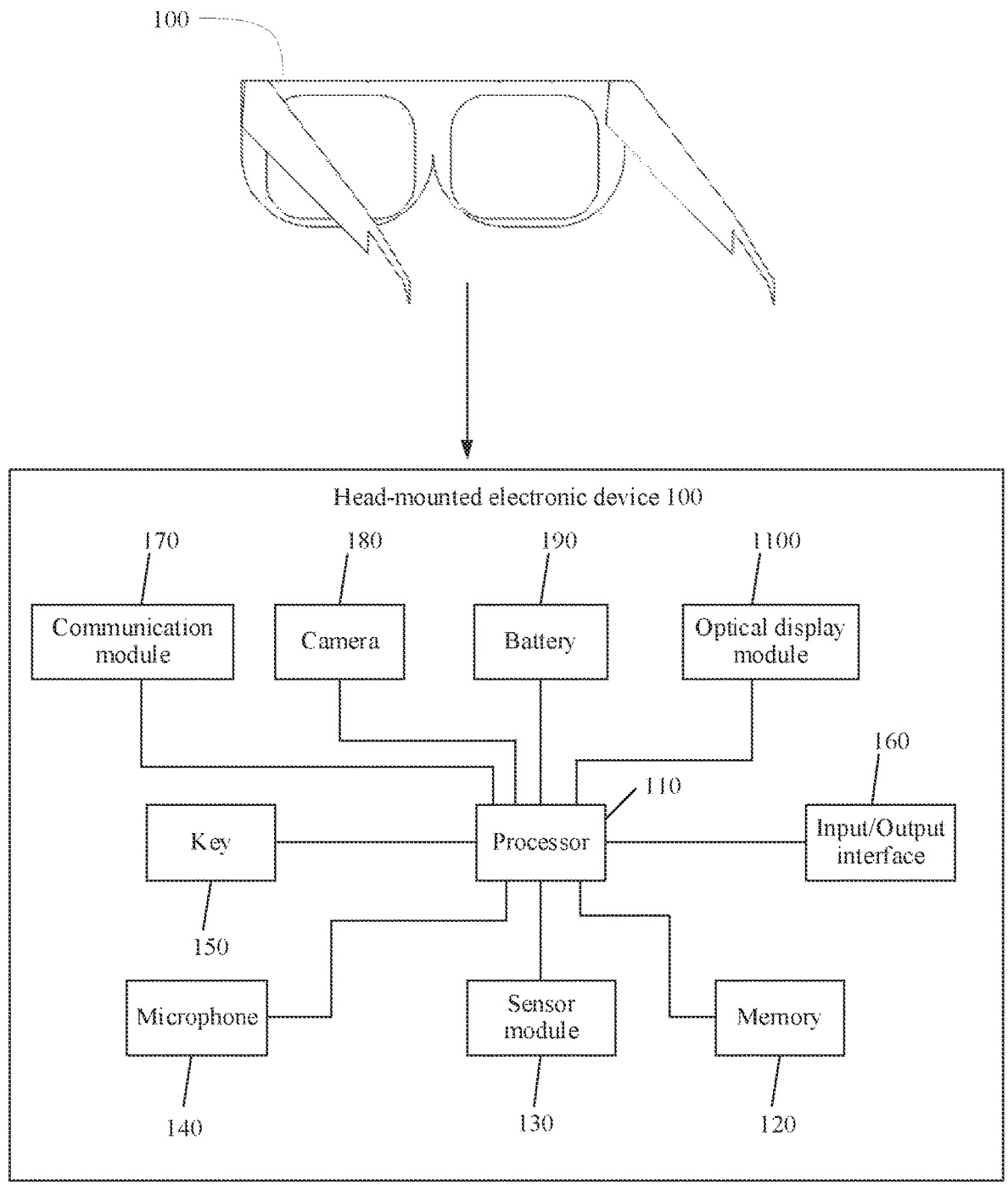
FIG. 1 is a schematic diagram of a structure of a head-mounted electronic device according to an embodiment of this application.

FIG. 1 is a schematic diagram of a structure of a head-mounted electronic device according to an embodiment of this application. As shown in FIG. 1, a head-mounted electronic device 100 may include a processor 110, a memory 120, a sensor module 130, a microphone 140, a key 150, an input/output interface 160, a communication module 170, a camera 180, a batten 190, an optical display module 1100, and the like.

It may be understood that a structure shown in this embodiment of this application does not constitute a specific limitation on the head-mounted electronic device 100. In some other embodiments of this application, the head-mounted electronic device 100 may include more or fewer components than those shown in the figure, have some components combined, have some components split, or have different component arrangements. The components shown in the figure may be implemented by using hardware, software, or a combination of software and hardware.

The processor 110 is usually configured to control an overall operation of the head-mounted electronic device 100, and may include one or more processing units. For example, the processor 110 may include an application processor (application processor, AP), a modem processor, a graphics processing unit (graphics processing unit, GPU), an image signal processor (image signal processor, ISP), a video processing unit (video processing unit, VPU) controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

A memory may be further disposed in the processor 110, and is configured to store instructions and data. In some embodiments, the memory in the processor 110 is a cache. The memory may store an instruction or data that is used or cyclically used by the processor 110. If the processor 110 needs to use the instruction or the data again, the instruction or the data may be directly called from the memory. This avoids repeated access, reduces waiting time of the processor 110, and improves system efficiency.

In some embodiments, the processor 110 may include one or more interfaces. The interfaces may include an inter-integrated circuit (inter-integrated circuit, I2C) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) port, a serial peripheral interface (serial peripheral interface, SPI) interface, and the like.

The I2C interface is a two-way synchronization serial bus, and includes one serial data line (serial data line, SDA) and one serial clock line (derail clock line, SCL). In some embodiments, the processor 110 may include a plurality of groups of I2C buses.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the communication module 170. For example, the processor 110 communicates with a Bluetooth module in the communication module 170 through the UART interface, to implement a Bluetooth function.

The MIPI interface may be configured to connect the processor 110 to a peripheral component such as the camera 180 or a display in the optical display module 1100.

The GPIO interface may be configured by software. The GPIO interface may be configured as a control signal or a data signal. In some embodiments, the GPIO interface may be configured to connect the processor 110 to the camera 180, the display in the optical display module 1100, the communication module 170, the sensor module 130, the microphone 140, and the like. The GPIO interface may alternatively be configured as an I2C interface, an I2S interface, a UART interface, an MIPI interface, or the like.

The USB port is a port that conforms to a USB standard specification, and may be specifically a mini USB port, a micro USB port, a USB type-C port, or the like. The USB port may be configured to connect to a charger to charge the head-mounted electronic device 100, may be configured to transmit data between the head-mounted electronic device 100 and a peripheral device, or may be configured to connect to a headset for playing audio through the headset. The port may be further configured to connect to another electronic device such as a mobile phone. The USB port may be a USB 3.0 port, and is configured to be compatible with a high-speed display port (display port, DP) for signal transmission, and may transmit high-speed audio and video data.

It may be understood that an interface connection relationship between the modules shown in this embodiment of this application is merely a schematic illustration, and does not constitute a structural limitation on the head-mounted electronic device 100. In some other embodiments of this application, the head-mounted electronic device 100 may alternatively use different interface connection manners or a combination of a plurality of interface connection manners in the foregoing embodiments.

In addition, the head-mounted electronic device 100 may include a wireless communication function. The communication module 170 may include a wireless communication module and a mobile communication module. The wireless communication function may be implemented through an antenna (not shown), a mobile communication module (not shown), a modem processor (not shown), a baseband processor (not shown), and the like.

The antenna is configured to send and receive electromagnetic wave signals. The head-mounted electronic device 100 may include a plurality of antennas. Each antenna may be configured to cover one or more communication bands. Different antennas may be further multiplexed to improve antenna utilization. For example, an antenna 1 may be multiplexed as a diversity antenna in a wireless local area network. In some other embodiments, an antenna may be used in combination with a tuning switch.

The mobile communication module may provide a wireless communication solution that is applied to the head-mounted electronic device 100 and that includes a 2nd generation (2nd generation, 2G) network, a 3rd generation (3rd generation, 3G) network, a 4th generation (4th generation, 4G) network, a 5th generation (5th generation, 5G) network, or the like. The mobile communication module may include at least one filter, a switch, a power amplifier, a low noise amplifier (low noise amplifier, LNA), and the like. The mobile communication module may receive an electromagnetic wave through an antenna, perform processing such as filtering and amplification on the received electromagnetic wave, and send a processed electromagnetic wave to the modem processor for demodulation. The mobile communication module may further amplify a signal modulated by the modem processor, convert the signal into an electromagnetic wave through the antenna, and radiate the electromagnetic wave. In some embodiments, at least some functional modules of the mobile communication module may be disposed in the processor 110. In some embodiments, at least some functional modules of the mobile communication module and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate the received electromagnetic wave signal into the low-frequency baseband signal. Then, the demodulator sends the demodulated low-frequency baseband signal to the baseband processor for processing. The low-frequency baseband signal is processed by the baseband processor and then sent to the application processor. The application processor outputs a sound signal through an audio device (not limited to a speaker or the like), or displays an image or a video through the display in the optical display module 1100. In some embodiments, the modem processor may be an independent component. In some other embodiments, the modem processor may be independent of the processor 110, and is disposed in a same device as the mobile communication module or another functional module.

The wireless communication module may provide a wireless communication solution that is applied to the head-mounted electronic device 100 and that includes a wireless local area network (wireless local area network, WLAN) (for example, a wireless fidelity (wireless fidelity, Wi-Fi) network), Bluetooth (Bluetooth. BT), a global navigation satellite system (global navigation satellite system, GNSS), frequency modulation (frequency modulation, FM), near field communication (near field communication, NFC), infrared (infrared, IR), or the like. The wireless communication module may be one or more devices integrating at least one communication processing module. The wireless communication module receives an electromagnetic wave through an antenna, performs frequency modulation and filtering on the electromagnetic wave signal, and sends a processed signal to the processor 110. The wireless communication module may further receive a to-be-sent signal from the processor 110, perform frequency modulation and amplification on the signal, convert the signal into an electromagnetic wave through the antenna, and radiate the electromagnetic wave.

In some embodiments, the antenna of the head-mounted electronic device 100 is coupled to the mobile communication module, so that the head-mounted electronic device 100 can communicate with a network and another device through a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The head-mounted electronic device 100 implements a display function through the GPU, the optical display module 1100, the application processor, and the like. The GPU is a microprocessor for image processing, and is connected to the optical display module 1100 and the application processor. The GPU is configured to perform mathematical and geometric calculations, and render an image. The processor 110 may include one or more GPUs, which execute program instructions to generate or change display information.

The memory 120 may be configured to store computer-executable program code. The executable program code includes instructions. The processor 110 executes various functional applications and data processing of the head-mounted electronic device 100 by running the instructions stored in the memory 120. The memory 120 may include a program storage area and a data storage area. The program storage area may store an operating system, an application required by at least one function (for example, a sound playing function or an image playing function), and the like. The data storage area may store data (for example, audio data or a telephone book) created during use of the head-mounted electronic device 100. In addition, the memory 120 may include a high-speed random access memory, and may further include a non-volatile memory, for example, at least one magnetic disk storage device, a flash memory device, or a universal flash storage (universal flash storage, UFS).

The head-mounted electronic device 100 may use an audio module, a speaker, the microphone 140, a headset jack, the application processor, and the like to implement an audio function, such as music playing or recording.

The audio module is configured to convert digital audio information into analog audio signal output, and is also configured to convert analog audio input into a digital audio signal. The audio module may be further configured to encode and decode an audio signal. In some embodiments, the audio module may be disposed in the processor 110, or some functional modules in the audio module are disposed in the processor 110.

The speaker, also referred to as a "loudspeaker", is configured to convert an audio electrical signal into a sound signal. The head-mounted electronic device 100 may listen to music or listen to a hands-free call through the speaker.

The microphone 140, also referred to as a "voice tube" or a "mike", is configured to convert a sound signal into an electrical signal. The head-mounted electronic device 100 may be provided with at least one microphone 140. In some other embodiments, the head-mounted electronic device 100 may be provided with two microphones 140 to collect a sound signal, and further implement a noise reduction function. In some other embodiments, the head-mounted electronic device 100 may further be provided with three, four, or more microphones 140, to implement sound signal collection and noise reduction, and further identify a sound source, and implement a directional recording function, and the like.

The headset jack is configured to connect to a wired headset. The headset jack may be a USB port, or may be a 3.5 millimeters (mm) open mobile head-mounted electronic device platform (open mobile terminal platform, OMTP) standard interface, or a standard interface of cellular telecommunications industry association of the USA (cellular telecommunications industry association of the USA, CTIA).

In some embodiments, the head-mounted electronic device 100 may include one or more keys 150. These keys may control the head-mounted electronic device, and provide a function of accessing the head-mounted electronic device 100 for a user. The keys 150 may be in a form of a button, a switch, a dial, and a touch or near-touch sensing device (such as a touch sensor). Specifically, for example, the user may turn on the optical display module 1100 of the head-mounted electronic device 100 by pressing a button. The keys 150 include a power key, a volume key, and the like. The key 150 may be a mechanical key or a touch key. The head-mounted electronic device 100 may receive key input, and generate key signal input related to user settings and function control of the head-mounted electronic device 100.

In some embodiments, the head-mounted electronic device 100 may include the input/output interface 160. The input/output interface 160 may connect another apparatus to the head-mounted electronic device 100 through a suitable component. The component may include, for example, an audio/video jack, a data connector, and the like.

The optical display module 1100 is configured to present an image to the user under control of the processor. The optical display module 1100 may convert, through one or more optical devices of a reflector, a transmitting mirror, an optical waveguide, or the like, a real pixel image into a near-eye projected virtual image for display, to implement virtual interaction experience or interaction experience combining virtuality and reality. For example, the optical display module 1100 receives image data information sent by the processor, and presents a corresponding image to the user. The following describes diagrams of several example structures of an optical display module and an image display method in embodiments of this application.

In an example, the optical display module 1100 may include a mirror. The mirror may rotate under control of a drive signal. An example of the mirror is a micro-electro-mechanical system (micro-electronic-mechanical system, MEMS) mirror. The MEMS mirror in this application may be an electrostatically, electromagnetically, electrothermally, or piezoelectrically driven MEMS mirror.

Figure 2:
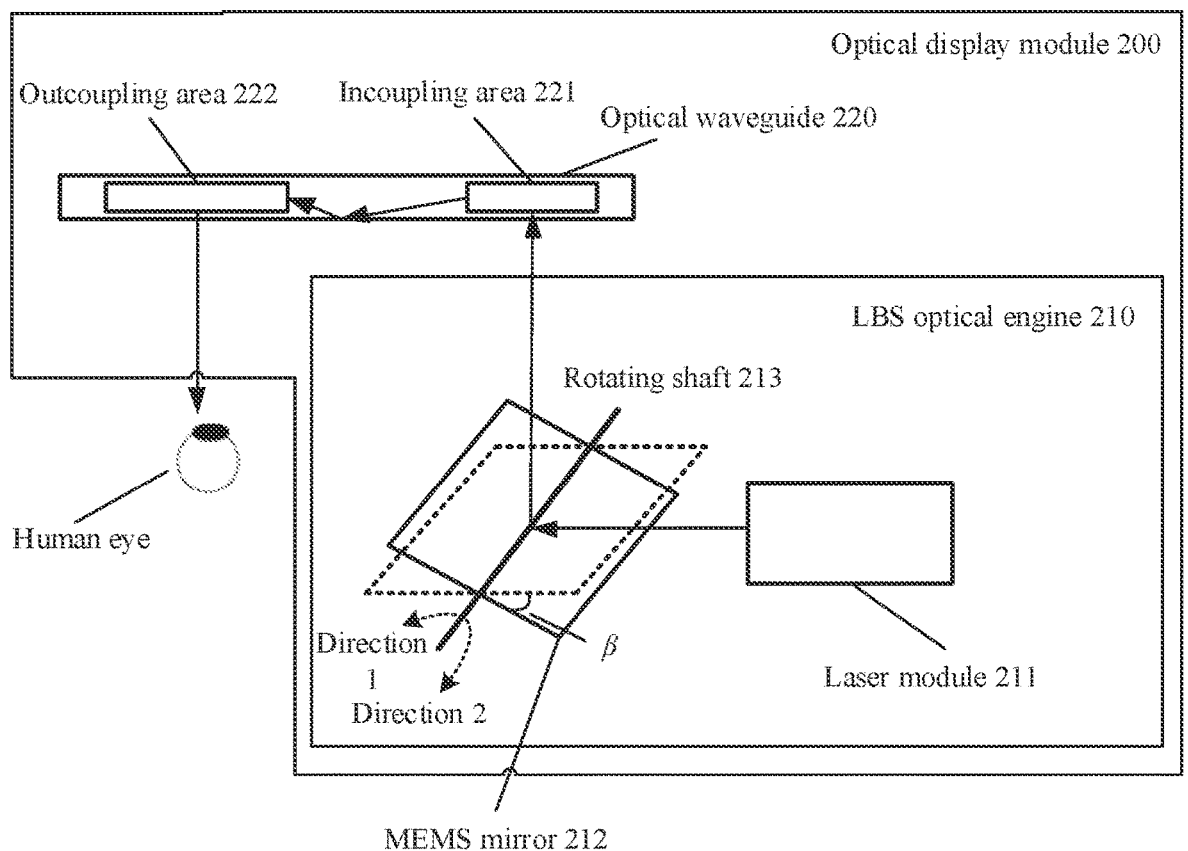
FIG. 2 is a schematic diagram of an optical display module according to an embodiment of this application.

The following describes an image display method of an optical display module according to an embodiment of this application with reference to FIG. 2 by using an example in which the optical display module includes an MEMS mirror.

As shown in FIG. 2, an optical display module 200 includes a laser beam scanning (laser beam scanning, LBS) optical engine 210 and an optical waveguide 220.

In some implementations, the LBS optical engine 210 may include a laser module 211 and a micro-electro-mechanical system (micro-electronic-mechanical system, MEMS) mirror 212. For the LBS optical engine in this implementation, the electronic device may further include a drive chip (not shown in the figure) of the MEMS mirror 212.

The laser module 211 may emit a real pixel image. The laser module 211 includes one or more laser light sources and one or more optical mirror groups. The laser light sources may be of a same color or a plurality of colors. The optical mirror group may include but is not limited to a condensing lens, a collimating lens, a beam combining prism, and a beam combining waveguide. The optical mirror group is configured to shape laser light emitted by a laser, even if a laser beam becomes a parallel beam with a circular light spot or a beam with another light spot shape and divergence angle. In some embodiments, the laser module may further include other related components such as a laser power detector and a temperature detector.

The MEMS mirror 212 is a tiny, drivable reflector manufactured based on a micro-electro-mechanical system technology. A surface diameter of the MEMS mirror 212 is usually only a few millimeters. The MEMS mirror 212 may rotate around a rotating shaft 213 to change an angle at which a beam incident to the MEMS mirror is emergent from the MEMS mirror, to change an angle at which a beam emitted by the laser module 211 is incident to an incoupling area 221 of an optical waveguide, further change an angle at which the beam is emergent from an outcoupling area 222 of the optical waveguide 220, and finally change an FOV of an image displayed on the optical display module 200.

In some embodiments, the MEMS mirror 212 may be a one-dimensional mirror. The one-dimensional mirror has only one rotating shaft. In some embodiments, the MEMS mirror 212 may be a two-dimensional mirror. The two-dimensional mirror has two rotating shafts that are perpendicular to each other.

An example in which the MEMS mirror includes one rotating shaft 213 shown in FIG. 2 is used to describe a rotation process of the MEMS mirror. As shown in FIG. 2, after a motor of the MEMS mirror receives an electrical signal, an electrified coil in the motor generates an electromagnetic torque. The electromagnetic torque enables a rotor in the motor to drive the MEMS mirror to rotate around the rotating shaft from an initial position in a direction 1 indicated by a dashed arrow in the figure. During rotation of the rotor, the rotor is subject to a reset torque applied by a mechanical torsional spring or an electronic method. A larger rotation angle of the rotor indicates a larger reset torque. The rotor drives the MEMS mirror to rotate to a position 1 in the direction 1. When the reset torque is equal to the electromagnetic torque, the rotor rotates in a direction 2, and the reset torque gradually decreases. After the MEMS mirror is driven by the rotor to return to the initial position, the electromagnetic torque enables the rotor to drive the MEMS mirror to continue to rotate to a position 2 in the direction 2. A reset torque applied when the rotor is at the position 2 is equal to the electromagnetic torque. A process in which the rotor rotates from the initial position to the position 2 is similar to a process in which the rotor rotates from the initial position to the position 1. Details are not described herein again. The MEMS mirror is driven by the rotor to continue to rotate from the position 2 to the position 2. The rotation is repeatedly performed. The rotation may be referred to as vibrational rotation. In this embodiment, a maximum rotation angle of the MEMS mirror 212 during the vibrational rotation is an angle between the position 1 and the position 2. For example, a rotation angle of the MEMS mirror that rotates from a position of a solid box in FIG. 2 to a position of a dashed box is denoted as β.

The optical waveguide 220 is a dielectric apparatus that guides an optical wave to propagate, and may also be referred to as a dielectric optical waveguide. The optical waveguide in this embodiment may be a diffractive optical waveguide, a holographic optical waveguide, an arrayed optical waveguide, or the like. The optical waveguide includes at least one light incoupling area 221 and one light outcoupling area 222.

A working principle of displaying an image by the optical display module shown in FIG. 2 is as follows: The laser light source in the laser module 211 emits, under control of a processor, a laser beam corresponding to a to-be-displayed image. The laser beam is shaped by the optical mirror group in the laser module 211 and emitted to the MEMS mirror 212. After receiving a signal sent by the drive chip, the MEMS mirror 212 performs vibrational rotation based on the signal, to reflect, at different moments at different angles, the laser beam that is incident to the MEMS mirror 212 to the light incoupling area 221 of the optical waveguide 220. After the laser beam is incident to the light incoupling area 221 of the optical waveguide 220, the laser beam is transmitted to the light outcoupling area 222, so that a human eye can receive light emergent from the light coupling area 222, to display a virtual image.

When signals output by the drive chip to the MEMS mirror are different, maximum rotation angles of the mirror 212 are different, sizes of areas of light reflected by the mirror 212 and incident to the coupling area 221 of the optical waveguide 220 are different, and sizes of areas of light emergent from the outcoupling area 222 are also different, so that FOVs of images displayed on the optical display module are different.

In another example, the optical display module in this application may include a display. The display is configured to display a real pixel image. For example, the display may be a self-luminous display or a reflective display.

Optionally, the optical display module may further include a first mirror group. The first mirror group is configured to present, to a user at a specified angle, light emergent from the display, to display a virtual image. The first mirror group may include one or more mirrors, such as a lens and a reflector.

Optionally, the optical display module may further include an optical waveguide. The optical waveguide is configured to present, to the user, light emergent from the first mirror group, to display a virtual image.

When the display is a reflective display, the optical display module may further include a light source. In this case, the display is configured to reflect a light wave emitted by the light source.

Optionally, when the optical display module includes the reflective display and the light source, the optical display module may further include a second mirror group. The second mirror group is configured to output, to the reflective display at a specified angle, light emitted by the light source. The second mirror group may include one or more mirrors, such as a lens and a reflector.

Figure 3A:
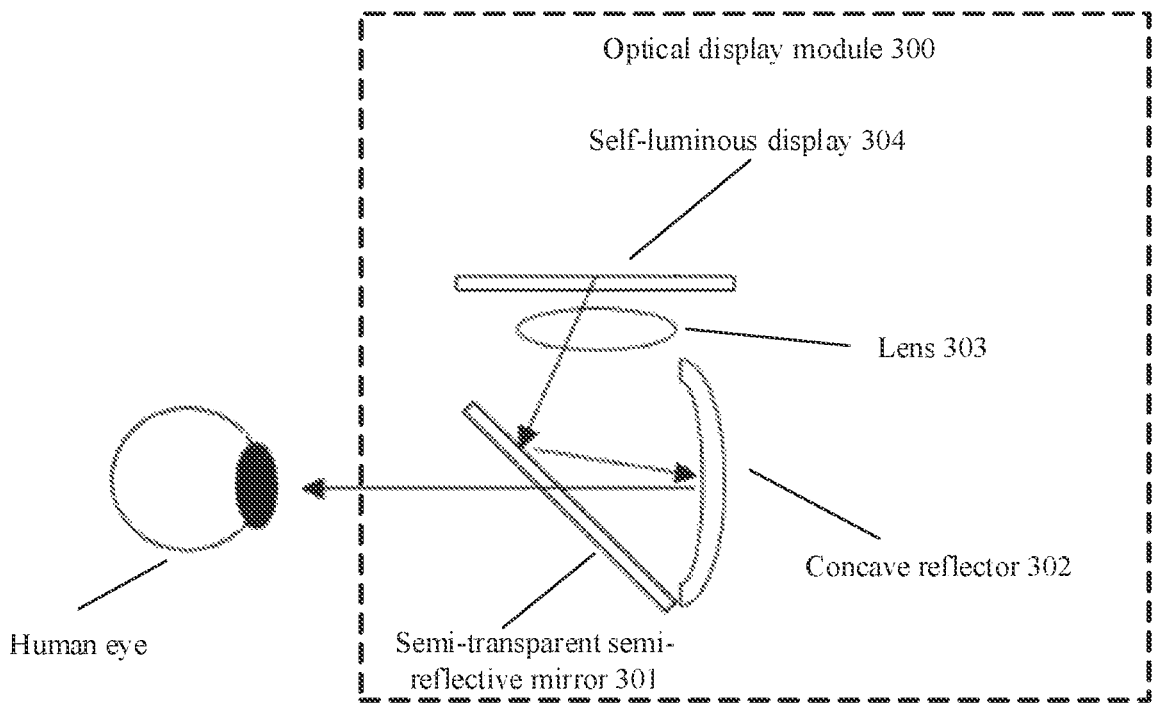
FIG. 3a and FIG. 3b are schematic diagrams of structures of another optical display module according to an embodiment of this application.

The following describes an image display method of an optical display module according to another embodiment of this application with reference to FIG. 3a by using an example in which the optical display module includes a self-luminous display and a first mirror group and the first mirror group includes a semi-transparent semi-reflective mirror, a concave reflector, and a lens.

As shown in FIG. 3a, an optical display module 300 includes a semi-transparent semi-reflective mirror 301, a concave reflector 302, a lens 303, and a self-luminous display 304. The semi-transparent semi-reflective mirror 301, the concave reflector 302, and the lens 303 may be optical devices, and may deflect an optical path emitted by the self-luminous display 304. The semi-transparent semi-reflective mirror 301, the concave reflector 302, and the lens 303 are configured to present, to a user at a specified angle, light emitted by the self-luminous display 304, to display a virtual image. The specified angle is determined by positions of the semi-transparent semi-reflective mirror 301, the concave reflector 302, and the lens 303.

The self-luminous display 304 may be an organic light emitting diode (organic light emitting diode, OLED), a liquid crystal display (liquid crystal display, LCD), a micro light emitting diode (micro light emitting diode, Micro LED), or the like. It should be noted that the self-luminous display 304 is a display whose resolution is adjustable.

A working principle of the optical display module 300 in FIG. 3a is as follows: The self-luminous display 304 receives image information and resolution information that are sent by a processor. The resolution information indicates a resolution of the display 304. The self-luminous display 304 emits, by using the resolution indicated by the resolution information, a beam corresponding to a to-be-displayed image. The beam emitted by the display 304 is emergent after passing through the lens 303, the semi-transparent semi-reflective mirror 301, and the concave reflector 302, and can be received by a human eye, to display the image for the user.

Figure 3B:
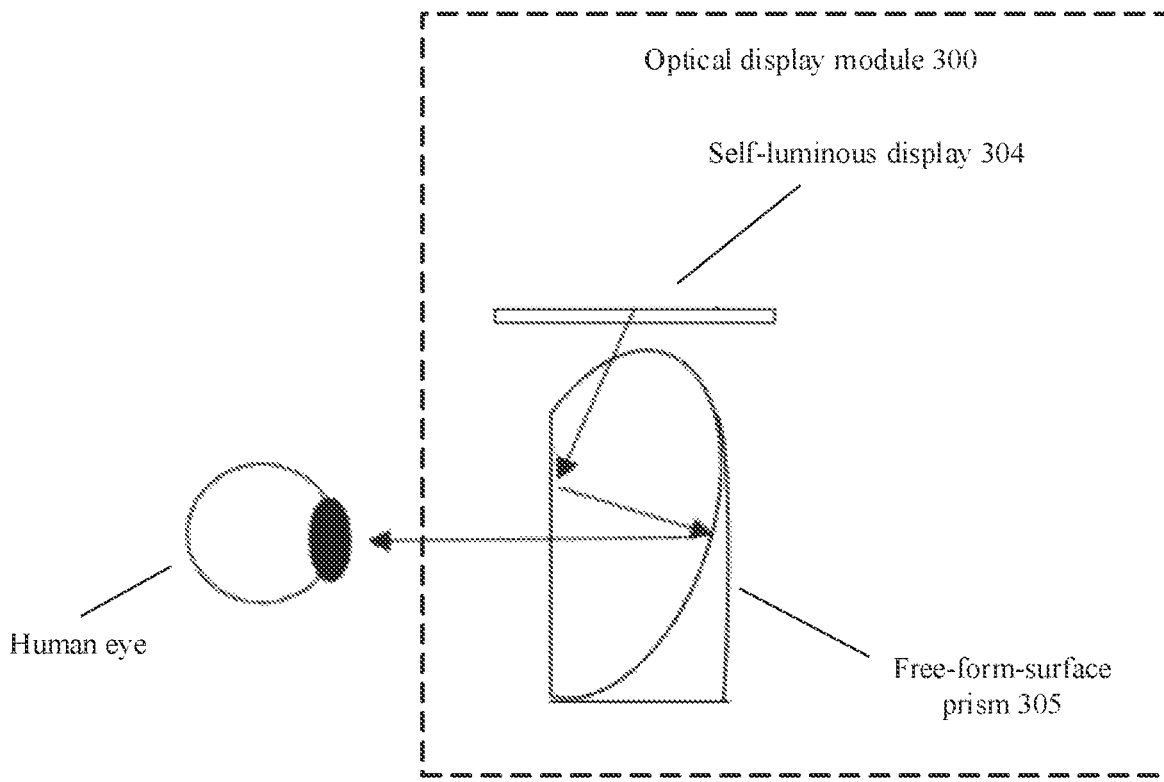

Another example of the optical display module is shown in FIG. 3b. The optical display module 300 includes a self-luminous display 304 and a free-form-surface prism 305. The free-form-surface prism 305 may be an optical device, and may deflect an optical path emitted by the self-luminous display 304, and is configured to present, to a user at a specified angle, light emitted by the self-luminous display 304, to display a virtual image.

The following describes an image display method of an optical display module according to another embodiment of this application with reference to FIG. 3b by using an example in which the optical display module includes a self-luminous display and a first mirror group and the first mirror group includes a free-form-surface prism.

It can be learned from FIG. 3b that the optical display module 300 includes the self-luminous display 304 and the free-form-surface prism 305. The free-form-surface prism is configured to present, to the user at the specified angle, the light emitted by the self-luminous display. The specified angle is determined by a position of the free-form-surface prism.

A working principle of the optical display module 300 in FIG. 3b is as follows: The self-luminous display 304 receives image information and resolution information that are sent by a processor. The resolution information indicates a resolution of the display 304. The self-luminous display 304 emits, by using the resolution indicated by the resolution information, a beam corresponding to a to-be-displayed image. The beam emitted by the display 304 is emergent after passing through the free-form-surface prism 305, and can be received by a human eye, to display the image for the user.

Figure 4:
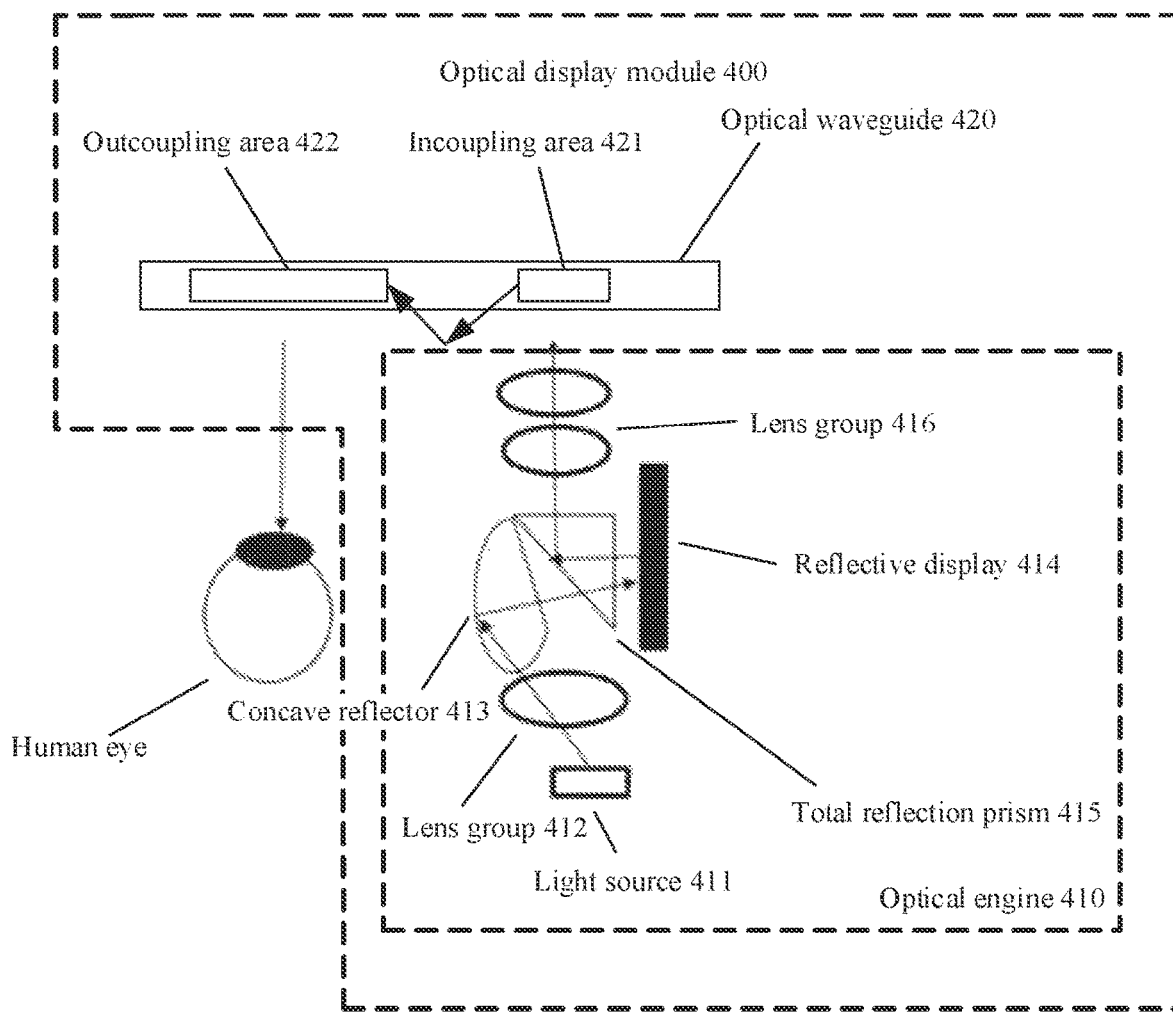
FIG. 4 is a schematic diagram of a structure of another optical display module according to an embodiment of this application.

The following describes an image display method of an optical display module according to another embodiment of this application with reference to FIG. 4 by using an example in which the optical display module includes a light source, a second mirror group, a reflective display, a first mirror group, and an optical waveguide, the first mirror group includes a total reflection prism and a plurality of lenses, and the second mirror group includes a concave reflector and a plurality of lenses.

As shown in FIG. 4, an optical display module 400 includes an optical engine 410 and an optical waveguide 420. The optical engine 410 may include a digital optical processor (digital light processing, DLP) optical engine or a liquid crystal on silicon (liquid crystal on Silicon, LCOS) optical engine.

The optical engine 410 mainly includes a light source 411, a lens group 412, a concave reflector 413, a reflective display 414, a total reflection prism 415, and a lens group 416. The total reflection prism 415, the lens group 416, and the optical waveguide 420 may be optical devices, and may deflect an optical path emitted by the reflective display 414, and are configured to present, to a user at a specified angle, light emitted by the reflective display 414, to display a virtual image. The lens group 412 and the concave reflector 413 constitute a second mirror group, and are configured to transmit, to the reflective display 414 at a specified angle, light emitted by the light source 411. The total reflection prism 415 and the lens group 416 constitute a first mirror group, and are configured to transmit, to an incoupling area 421 of the optical waveguide 420 at a specified angle, light output by the reflective display 414.

The light source 411 may be a light emitting diode (light emitting diode, LED) or another light source with an adjustable illuminated area light-emitting. The reflective display 414 may be a digital micromirror display (digital micromirror device, DMD) or an LCOS display. The lens group 412 and the lens group 416 may each include one or more lenses. When the reflective display 414 is a DMD display, the optical engine 410 is a DLP optical engine. When the reflective display 414 is an LCOS display, the optical engine 410 is an LCOS optical engine.

A working principle of the optical display module 400 is as follows: The light source 411 emits a beam. The beam emitted by the light source 411 is incident to the concave reflector 413 after passing through the lens group 412. The beam emergent from the concave reflector is incident to the reflective display 414. The beam incident to the display 414 is reflected by the display 414 to obtain an imaging beam. The imaging beam emergent from the display 414 is incident to the total reflection prism 415. The imaging beam output by the total reflection prism 415 is incident to the incoupling area 421 of the optical waveguide 420 after passing through the lens group 416. After being propagated in the optical waveguide 420, the imaging beam is emergent from an outcoupling area 422, and finally can be received by a human eye, to implement an image display function.

It may be understood that the optical display module 400 in this embodiment is merely an example of the optical display module, and may alternatively include more or fewer components, or some components may be replaced by other components having a same function. For example, the concave reflector 413 and the total reflection prism 415 may be replaced by a prism group or a polarization beam splitter (polarization beam splitter, PBS).

In recent years, as technologies of an electronic device (for example, AR glasses) develop, functions of the electronic device are increasingly diversified, for example, more diversified functions such as optical display, audio, and interaction. There are many application fields, such as the industrial field and consumer products. There are various application scenarios. For example, in the consumer field, there may be large-screen viewing, large-screen office, incoming call, message notification, simple navigation, and the like.

In scenarios such as large-screen viewing or large-screen office, a large image usually needs to be displayed. In scenarios such as incoming call, message notification, and simple navigation, only a small image usually needs to be displayed. It can be learned that the electronic device needs to be able to display a large image and a small image, and switch between the large image and the small image.

For the electronic device, when a diagonal FOV of a display module is large, the large image can be displayed. For example, when the diagonal FOV of the display module is greater than or equal to 30 degrees, an image displayed by the display module is large. When the diagonal FOV of the display module is small, the display module can display the small image. For example, when the diagonal FOV of the display module is less than 30 degrees, an image displayed by the display module is small. Therefore, this application provided a technical solution in which a size of a displayed image can be adjusted by adjusting a diagonal FOV of a display module.

In other words, in the technical solution provided in this application, the electronic device can switch between different FOVs, for example, switch between a large FOV and a small FOV. In embodiments of this application, for ease of description, an image of a large FOV displayed by the display module is referred to as a large-FOV image, and an image of a small FOV displayed by the display module is referred to as a small-FOV image.

Because the electronic device has different power consumption when images of different FOVs are displayed, this application provides a technical solution of adjusting or switching an FOV based on power statuses of the electronic device. The power statuses in this application may include a status of a connection to an external power supply device or a battery level status. The status of the connection to the external power supply device may also be referred to as a charging status.

Because the electronic device has high power consumption when the large-FOV image is displayed, this application provides a technical solution of displaying the small-FOV image when the electronic device has a low battery level or is not connected to the external power supply device, to ensure high-quality display of an image.

Further, in the technical solution provided in this application, in some scenarios in which it is not necessary to display the large-FOV image, for example, in a scenario in which the electronic device displays an image in an interactive application or an office application, the small-FOV image is displayed only when the electronic device has a low battery level or is not connected to the external power supply device.

In some implementations of the technical solutions provided in this application, the electronic device may determine, based on whether the electronic device is connected to the external power supply device, whether to display the large FOV or the small FOV, or may determine, based on a battery level of the electronic device, whether to display the large FOV or the small FOV.

Figure 5A:
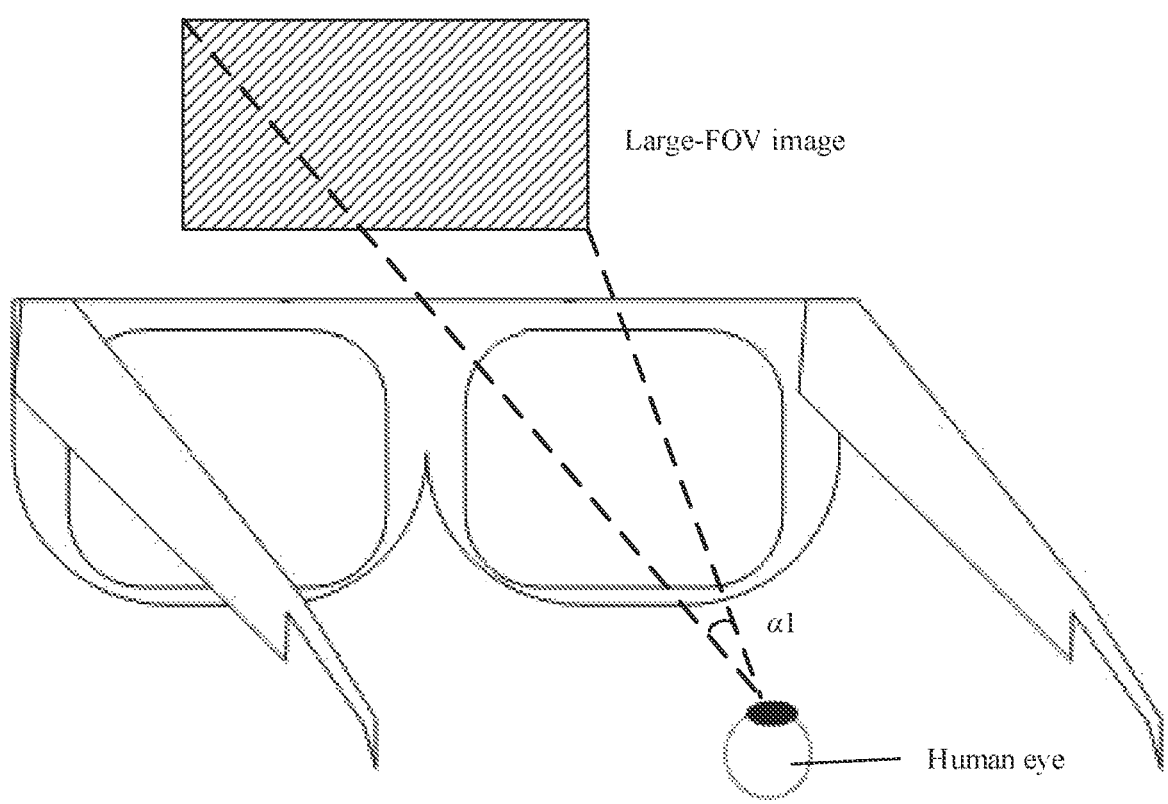
FIG. 5a is a schematic diagram of a large-FOV image according to an embodiment of this application.
Figure 5B:
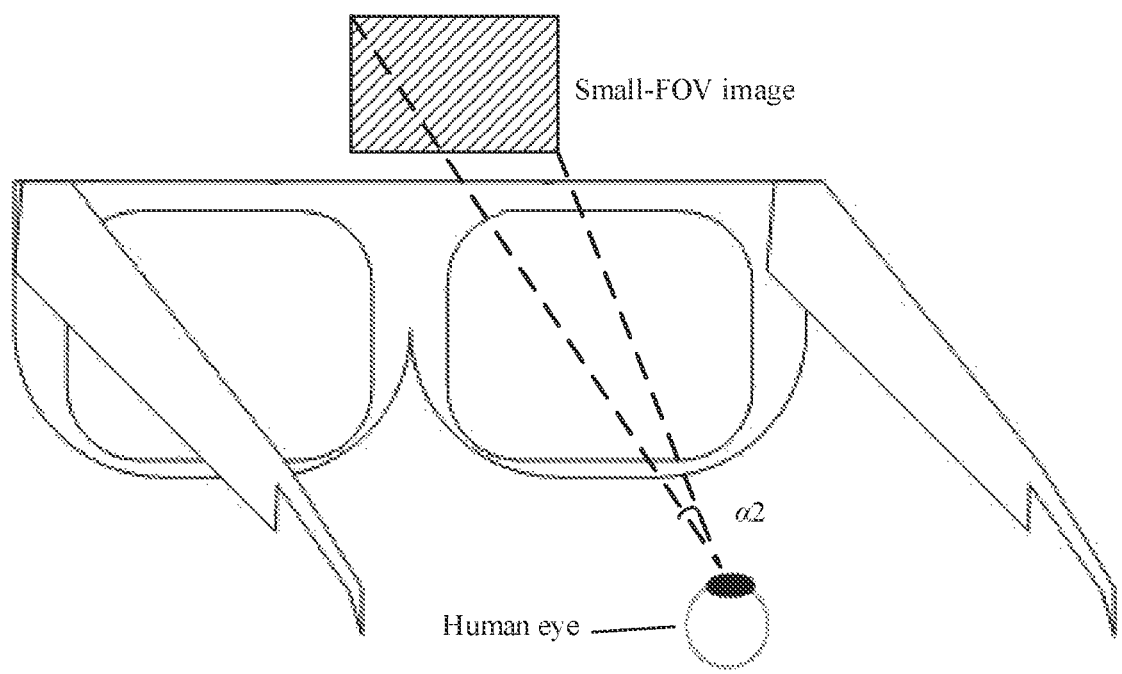
FIG. 5b is a schematic diagram of a small-FOV image according to an embodiment of this application.

FIG. 5a is a schematic diagram of a large-FOV image according to an embodiment of this application, and shows that an image viewed by a human eye of a user through ahead-mounted electronic device is a large-FOV image. The large-FOV image may be a virtual image. FIG. 5b is a schematic diagram of a small-FOV image according to an embodiment of this application, and shows that an image viewed by a human eye of a user through a head-mounted electronic device is a small-FOV image. The small-FOV image may be a virtual image. It can be learned from FIG. 5a and FIG. 5b that a diagonal angle α1 of the large-FOV image displayed by the head-mounted electronic device is greater than a diagonal angle α2 of the small-FOV image displayed by the head-mounted electronic device.

In some embodiments of this application, the head-mounted electronic device may determine, based on whether the head-mounted electronic device is connected to an external power supply device, a battery level status to determine whether to display the large-FOV image or the small-FOV image. The external power supply device may be understood as a device that can supply power to the electronic device. The external power supply device may be connected to the electronic device in a wired manner (namely, wired charging), or may be connected to the electronic device in a wireless manner (namely, wireless charging). A connection manner between the electronic device and the external power supply device is not limited in embodiments of this application. An example of the external power supply device may include a mobile phone, a notebook computer, a tablet computer, a desktop computer, or the like.

In some implementations, the head-mounted electronic device may determine, by detecting an input/output interface of the head-mounted electronic device, whether the head-mounted electronic device is connected to the external power supply device. For example, a processor of the head-mounted electronic device detects whether there is voltage input on the input/output interface of the head-mounted electronic device. If there is voltage input, it may be determined that the head-mounted electronic device is connected to the external power supply device, otherwise, it may be determined that the head-mounted electronic device is not connected to the external power supply device.

Figure 6A:
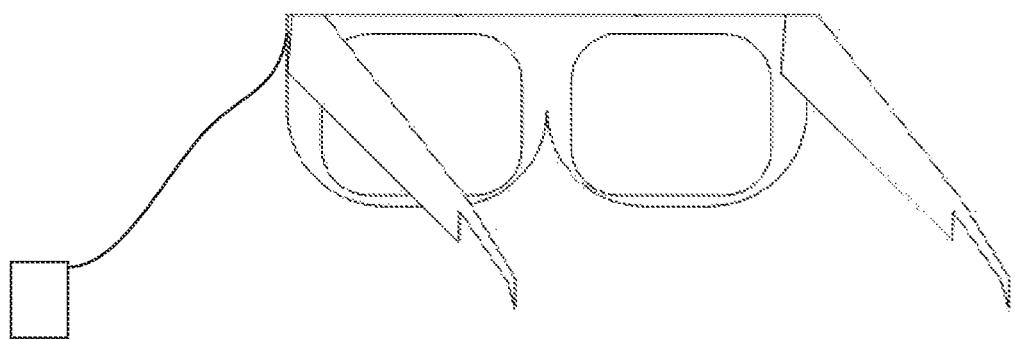
FIG. 6a to FIG. 6c are schematic diagrams of an image display process of some head-mounted electronic devices according to an embodiment of this application.
Figure 6B:
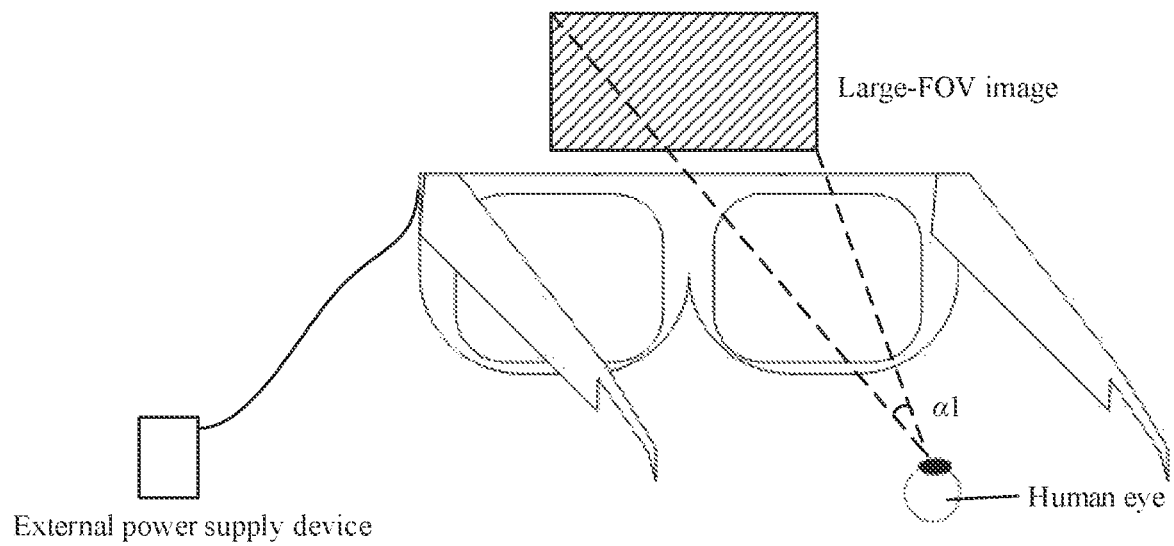
Figure 6C:
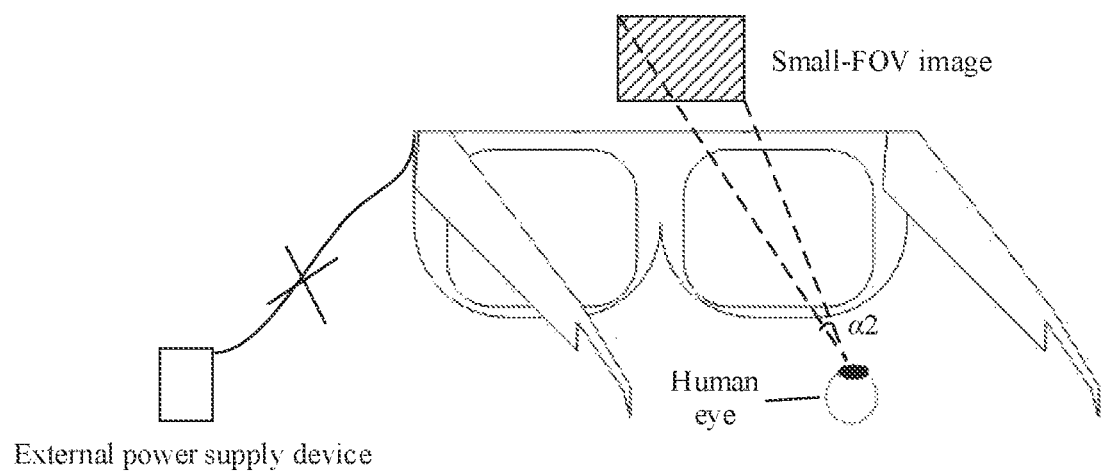

FIG. 6a to FIG. 6c are schematic diagrams of an image display process of a head-mounted electronic device according to an embodiment of this application. As shown in FIG. 6a, the head-mounted electronic device is in an off state and is connected to an external power supply device.

After a user presses a start key (or a power on/off key) of the head-mounted electronic device, the head-mounted electronic device enters a power-on state, and detects that the head-mounted electronic device is currently connected to the external power supply device. Therefore, a large-FOV image shown in FIG. 6b can be displayed.

During operation of the head-mounted electronic device, if the head-mounted electronic device detects that the head-mounted electronic device is disconnected from the external power supply device, the head-mounted electronic device may display a small-FOV image shown in FIG. 6c.

In the image display method in this embodiment, when the head-mounted electronic device is connected to the external power supply device, a large FOV is displayed, so that a display capability of the head-mounted electronic device can be improved, and a requirement of the user for an FOV of an image can be met. When the head-mounted electronic device is not connected to the external power supply device, switching to a small FOV can reduce power consumption of the head-mounted electronic device, and prolong a use time of the head-mounted electronic device.

Figure 7A:
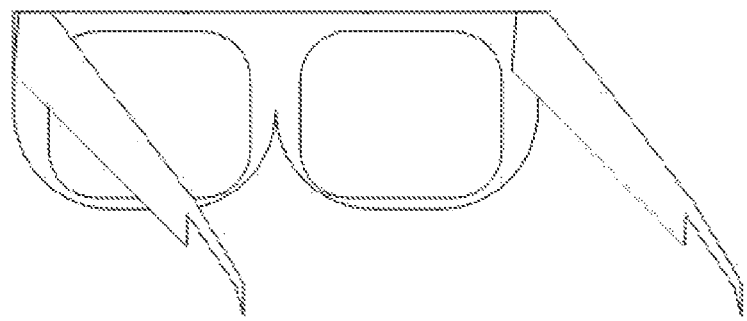
FIG. 7a to FIG. 7c are schematic diagrams of an image display process of some head-mounted electronic devices according to another embodiment of this application.
Figure 7B:
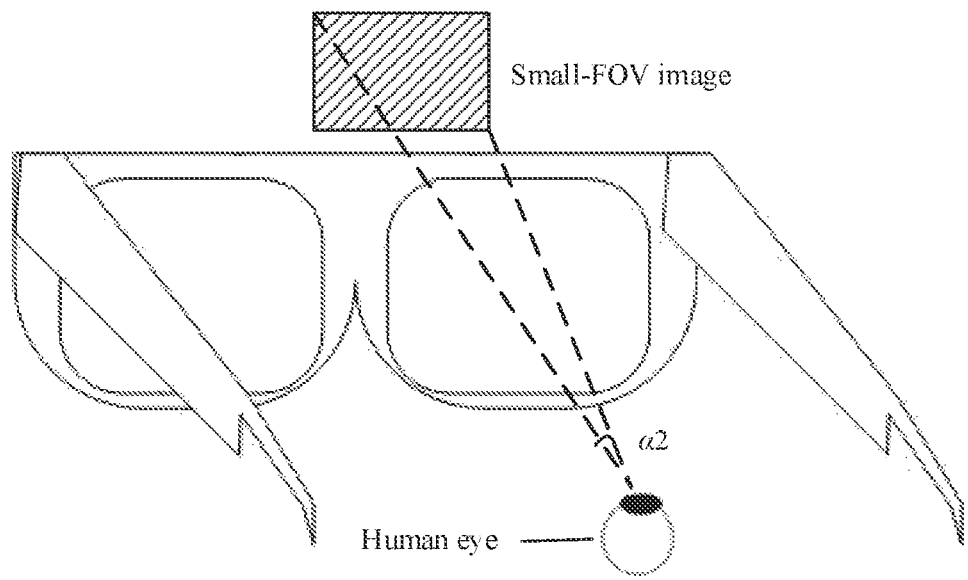
Figure 7C:
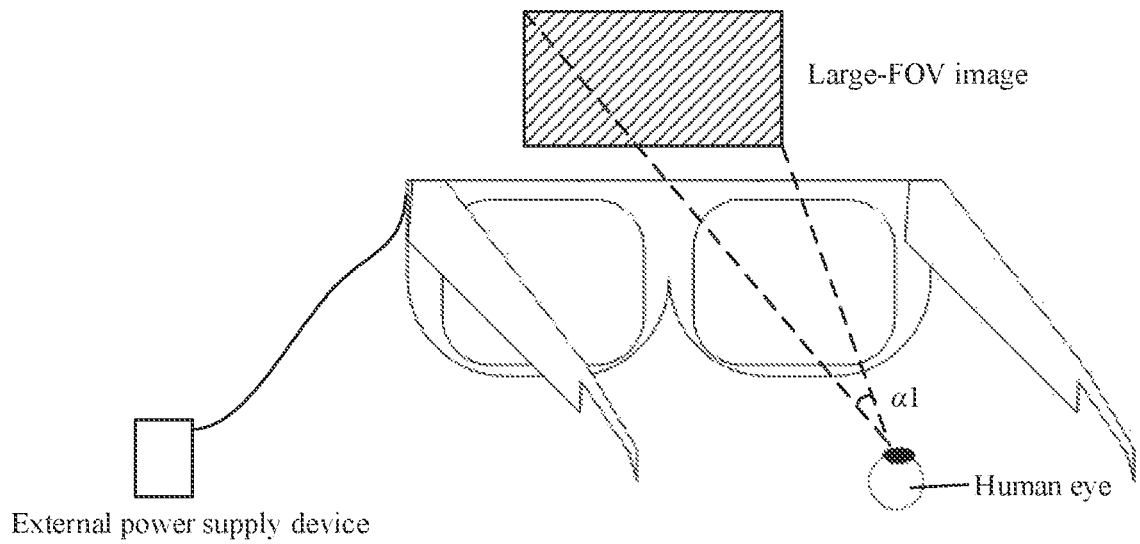

FIG. 7a to FIG. 7c are schematic diagrams of an image display process of a head-mounted electronic device according to another embodiment of this application. As shown in FIG. 7a, the head-mounted electronic device is in an off state and is not connected to an external power supply device.

After a user presses a start key (or a power on/off key) of the head-mounted electronic device, the head-mounted electronic device enters a power-on state, and detects that the head-mounted electronic device is currently not connected to the external power supply device. Therefore, a small-FOV image shown in FIG. 7b can be displayed.

It may be understood that when the head-mounted electronic device is connected to a peripheral device, but the peripheral device cannot supply power to the head-mounted electronic device and can only perform data transmission with the head-mounted electronic device, it may be equivalent to that the head-mounted electronic device is not connected to the external power supply device. In this case, the head-mounted electronic device may display the small-FOV image.

During operation of the head-mounted electronic device, if the head-mounted electronic device detects that the head-mounted electronic device is connected to the external power supply device, the head-mounted electronic device may display a large-FOV image shown in FIG. 7c.

In this embodiment, the large-FOV image is displayed when sufficient power supply is ensured, so that a better display effect can be provided for the user, and user experience can be improved. The small-FOV image is displayed when there is no external power supply device, so that energy consumption can be reduced, a working time of the head-mounted electronic device can be prolonged, and user experience can be improved.

In the image display method in this embodiment, when the head-mounted electronic device is not connected to the external power supply device, a small FOV is displayed, so that power consumption of the head-mounted electronic device can be reduced, and a use time of the head-mounted electronic device can be prolonged. When the head-mounted electronic device is connected to the external power supply device, switching to a large FOV can improve a display capability of the head-mounted electronic device, and a requirement of the user for an FOV of an image can be met.

In some implementations of this embodiment, the FOV displayed when the head-mounted electronic device is connected to the external power supply device is the large FOV or the small FOV, and may be set by default before delivery of the head-mounted electronic device, or may be set by the user for the head-mounted electronic device. Similarly, the FOV displayed when the head-mounted electronic device is not connected to the external power supply device is the large FOV or the small FOV, and may be set by default before delivery of the head-mounted electronic device, or may be set by the user for the head-mounted electronic device.

Figure 8A:
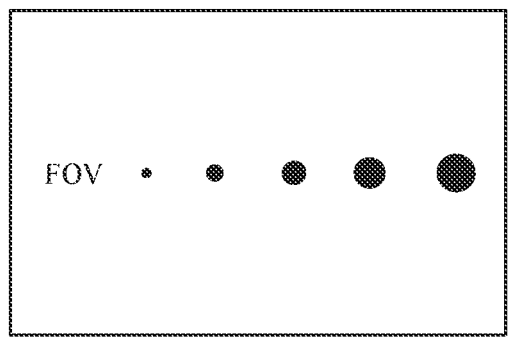
FIG. 8a is a schematic diagram of setting an FOV of a head-mounted electronic device according to an embodiment of this application.

In some implementations of this embodiment, during the operation of the head-mounted electronic device, the user may set the FOV of the head-mounted electronic device. For example, the user sets the FOV of the head-mounted electronic device to the large FOV, an intermediate-state FOV, or the small FOV. As shown in FIG. 8a, the electronic device has five FOVs. FOVs represented by five circles from left to right sequentially increase. In other words, the smallest circle represents the small FOV, and the largest circle represents the large FOV. Three intermediate-state FOVs are further included between the small FOV and the large FOV. Correspondingly, an image displayed by the head-mounted electronic device is the large-FOV image, the small-FOV image, or an intermediate-state-FOV image.

For example, the FOV displayed when the electronic device is not connected to the external power supply device is set to a first FOV. The FOV displayed when the electronic device is connected to the external power supply device is set to a second FOV. The first FOV is less than the second FOV. An FOV displayed when a battery level of the electronic device is less than a first battery level is set to a third FOV. An FOV displayed when the battery level of the electronic device is greater than the first battery level is set to a fourth FOV. The third FOV is less than the fourth FOV.

Magnitude relationships of the first FOV with the third FOV and the fourth FOV are not limited. Magnitude relationships of the second FOV with the third FOV and the fourth FOV are not limited.

In an example, the third FOV is equal to the first FOV, and/or the second FOV is equal to the fourth FOV.

In another example, the third FOV is less than the first FOV. For example, when the electronic device is not connected to the external power supply device and displays the first FOV, if the battery level is less than the preset first battery level, the FOV of the electronic device may be switched from the first FOV to the third FOV that is less than the first FOV, to prolong the use time of the electronic device.

In another example, the second FOV is greater than the fourth FOV. For example, when the electronic device is not connected to the external power supply device and displays the fourth FOV and the battery level is greater than the first battery level, if the electronic device is connected to the external power supply device, the FOV of the electronic device may be switched from the fourth FOV to the second FOV that is greater than the fourth FOV, to provide better image experience for the user.

The following describes a process of setting the FOV of the electronic device and a setting result by using an example in which the electronic device has only the large FOV and the small FOV.

Figure 8B:
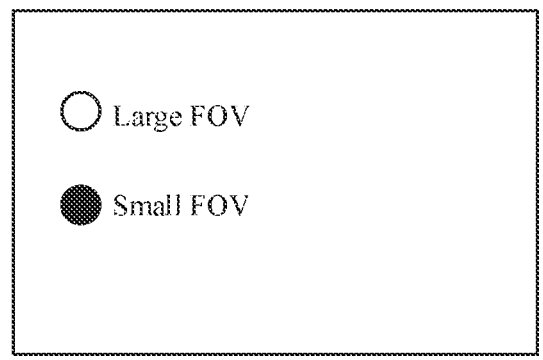
FIG. 8b is an interface diagram of setting an FOV of a head-mounted electronic device by a user according to an embodiment of this application.
Figure 8C:
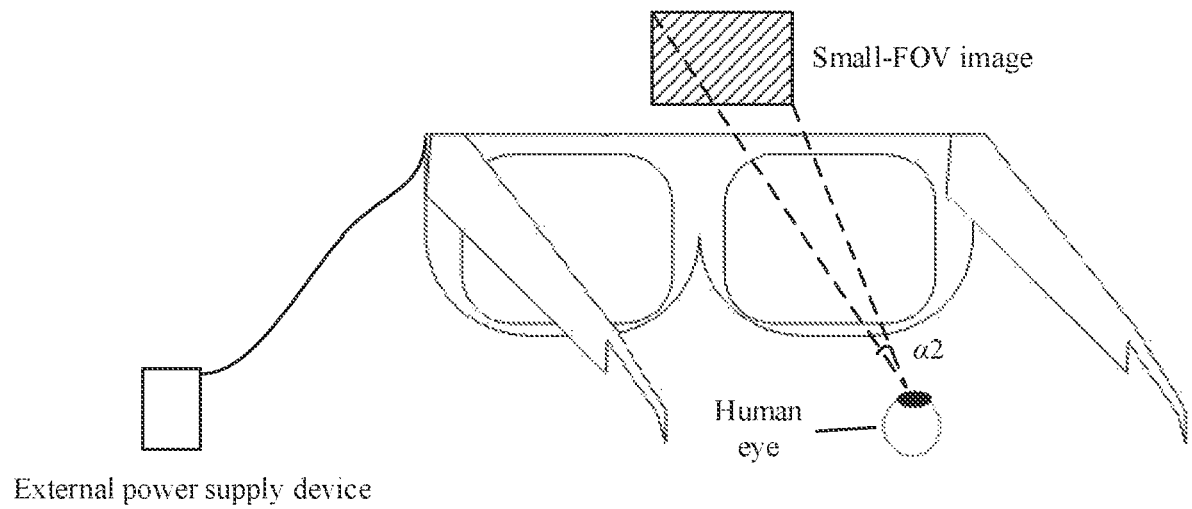
FIG. 8c is a diagram of a working state after a head-mounted electronic device switches to a small-FOV image according to an embodiment of this application.

In an example, when the head-mounted electronic device is in a working state shown in FIG. 6b, if the user sets the FOV of the head-mounted electronic device to the small FOV, the head-mounted electronic device switches to the small FOV, that is, displays the small-FOV image. An interface diagram of setting the FOV of the head-mounted electronic device by the user is shown in FIG. 8b. A working state after the head-mounted electronic device switches to the small-FOV image is shown in FIG. 8c.

In this example, if the user sets the FOV of the head-mounted electronic device to the large FOV, the head-mounted electronic device continues to display the large-FOV image.

Figure 9A:
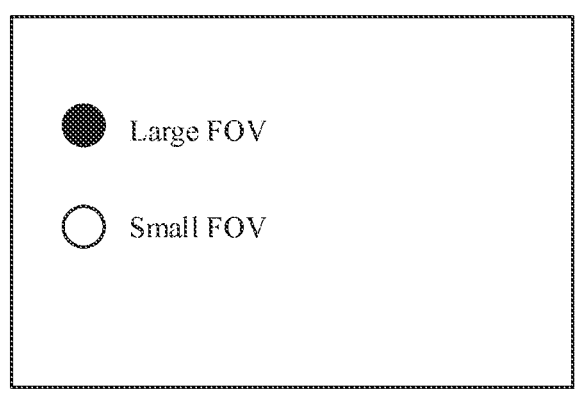
FIG. 9a is an interface diagram of setting an FOV of a head-mounted electronic device by a user according to another embodiment of this application.
Figure 9B:
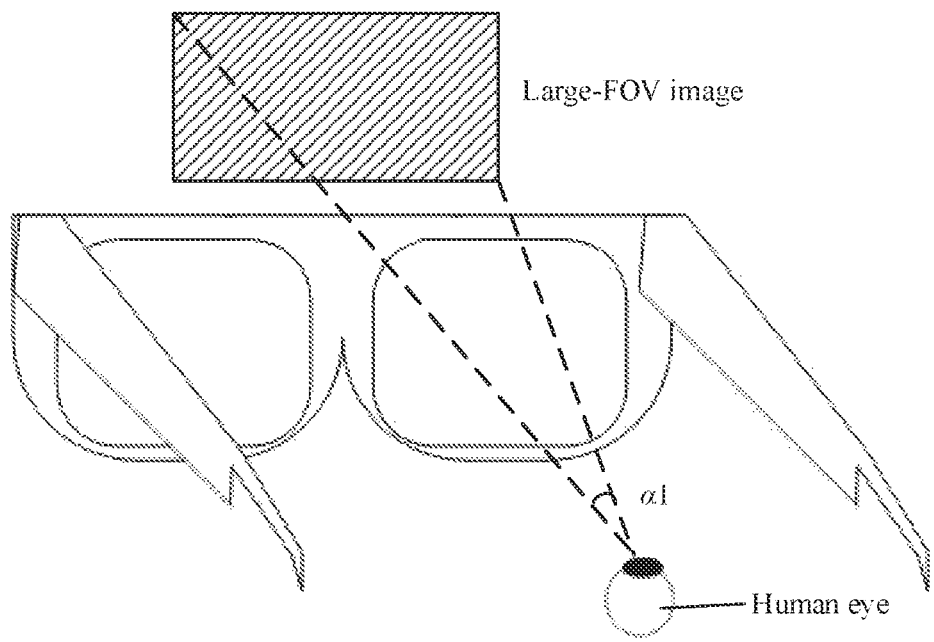
FIG. 9b is a diagram of a working state after a head-mounted electronic device switches to a large-FOV image according to an embodiment of this application.

In another example, when the head-mounted electronic device is in a working state shown in FIG. 7b, if the user sets the FOV of the head-mounted electronic device to the large FOV, the head-mounted electronic device switches to the large FOV, that is, displays the large-FOV image. An interface diagram of setting the FOV of the head-mounted electronic device by the user is shown in FIG. 9a. A working state after the head-mounted electronic device switches to the large-FOV image is shown in FIG. 9b.

In this example, if the user sets the FOV of the head-mounted electronic device to the small FOV, the head-mounted electronic device continues to display the small-FOV image.

In this embodiment, a quantity of times that the user sets the FOV of the head-mounted electronic device is not limited. For example, when the head-mounted electronic device is in the working state shown in FIG. 8b or the working state shown in FIG. 9b, the user may further set the FOV of the head-mounted electronic device.

For example, when the head-mounted electronic device is in the working state shown in FIG. 8b, the user may switch the FOV of the head-mounted electronic device to the large FOV, so that the head-mounted electronic device displays the large-FOV image.

For another example, when the head-mounted electronic device is in the working state shown in FIG. 9b, the user may switch the FOV of the head-mounted electronic device to the small FOV, so that the head-mounted electronic device displays the small-FOV image.

Figure 10A:
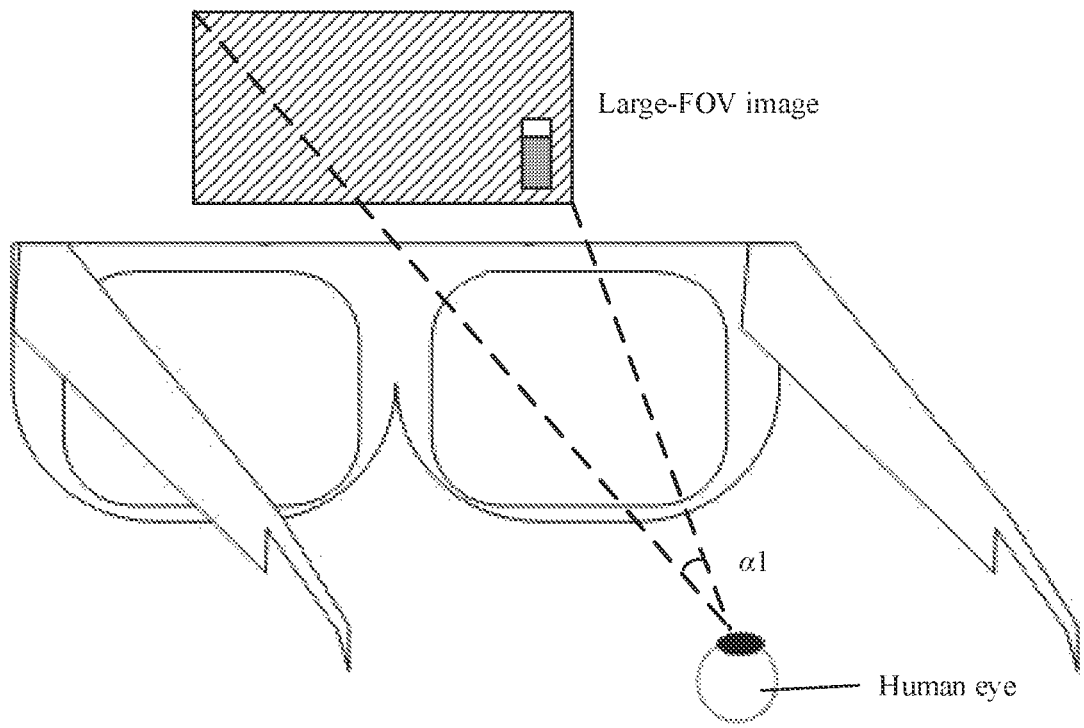
FIG. 10a is a diagram of a working state in which a head-mounted electronic device displays a large-FOV image when a battery level exceeds a first battery level according to an embodiment of this application.
Figure 10B:
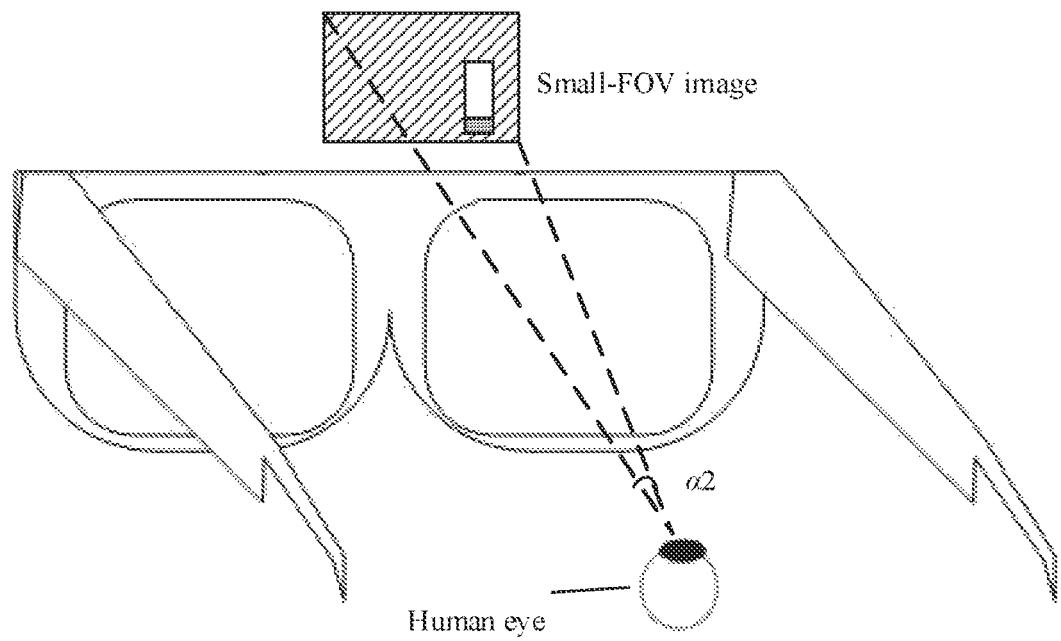
FIG. 10b is a diagram of a working state in which a head-mounted electronic device displays a small-FOV image when a battery level is less than a first battery level according to an embodiment of this application.

In some other embodiments of this application, the head-mounted electronic device may determine, based on the battery level, an image of which FOV to be displayed. As shown in FIG. 10a, the head-mounted electronic device displays the large-FOV image when the battery level exceeds the first battery level. As shown in FIG. 10b, the head-mounted electronic device displays the small-FOV image when the battery level is less than the first battery level.

In this embodiment, when power supply is sufficient, a better display effect can be provided for the user, and user experience can be improved. When power supply is insufficient, energy consumption can be reduced, a working time of the head-mounted electronic device can be prolonged, and user experience can be improved.

In this embodiment, the first battery level may be set by default before delivery of the head-mounted electronic device, or the first battery level may be set by the user for the head-mounted electronic device.

In some implementations of this embodiment, during the operation of the head-mounted electronic device, the user may further set the FOV of the head-mounted electronic device to switch the FOV based on a requirement of the user and provide an image of a corresponding FOV for the user.

In an example, when the battery level of the head-mounted electronic device exceeds the first battery level and the large-FOV image is displayed, if the user sets the FOV of the head-mounted electronic device to the small FOV, the head-mounted electronic device switches to the small FOV, that is, displays the small-FOV image. If the user sets the FOV of the head-mounted electronic device to the large FOV, the head-mounted electronic device continues to display the large-FOV image.

In another example, when the battery level of the head-mounted electronic device is less than the first battery level and the small-FOV image is displayed, if the user sets the FOV of the head-mounted electronic device to the large FOV, the head-mounted electronic device switches to the large FOV, that is, displays the large-FOV image. If the user sets the FOV of the head-mounted electronic device to the small FOV, the head-mounted electronic device continues to display the small-FOV image.

In this embodiment, a quantity of times that the user sets the FOV of the head-mounted electronic device is not limited.

In embodiments of this application, any one of the foregoing settings performed by the user on the head-mounted electronic device may be implemented through a setting button and/or a setting page provided by the head-mounted electronic device, or may be implemented through a terminal device (for example, a mobile phone or a computer) connected to the head-mounted electronic device. This is not limited in this application.

The following describes a manner of switching the FOV of the head-mounted electronic device in embodiments of this application by using an example in which the head-mounted electronic device includes the optical display module 200 shown in FIG. 2.

Correspondences between a plurality of FOVs and a plurality of binary values may be preset in a memory of the head-mounted electronic device. A binary value corresponding to the large FOV is greater than a binary value corresponding to the small FOV. In some implementations, the binary values range from 0 to 255.

After determining a target FOV of the head-mounted electronic device, a processor of the head-mounted electronic device may find, based on the correspondences between the FOVs and the binary values, a target binary value that matches the target FOV, and output, to the optical display module 200, a control signal that indicates the target binary value.

For example, when determining that the target FOV is the large FOV, the head-mounted electronic device may find, based on the correspondences between the FOVs and the binary values, a first target binary value corresponding to the large FOV, and output, to the optical display module, a control signal that indicates the first target binary value.

For another example, when determining that the target FOV is the small FOV, the head-mounted electronic device may find, based on the correspondences between the FOVs and the binary values, a second target binary value corresponding to the small FOV, and output, to the optical display module, a control signal that indicates the second target binary value.

After receiving the control signal, the drive chip of the MEMS mirror in the optical display module converts the control signal to generate a voltage signal, and outputs the voltage signal to the MEMS mirror. Generally, a smaller binary value indicated by the control signal indicates a smaller voltage signal value obtained through conversion. For example, 0 is converted into a minimum voltage signal value, and 255 is converted into a maximum voltage signal value.

After the motor of the MEMS mirror receives the voltage signal, the electrified coil in the motor generates an electromagnetic torque in a magnetic field. The electromagnetic torque enables the rotor in the motor to rotate. During the rotation of the rotor, a reset torque is applied to the rotor through a mechanical torsional spring or an electronic method. The reset torque increases as a rotation angle of the rotor increases. When the reset torque increases to be the same as the electromagnetic torque, the rotor moves in an opposite direction. During the movement of the rotor, the reset torque gradually decreases until the reset torque is zero. Then, the electromagnetic torque enables the rotor to rotate in an opposite direction. The rotation of the rotor in this direction is similar to the previous rotation. Details are not described herein again.

A larger voltage signal indicates a larger electromagnetic torque, so that a deflection angle of the reset torque of the MEMS mirror that is the same as the electromagnetic torque is larger, that is, a maximum deflection angle of the MEMS mirror is larger.

For example, if the first target binary value input by the processor of the head-mounted electronic device to the drive chip of the MEMS mirror is greater than the second target binary value, a first voltage signal output by the drive chip to the motor of the MEMS mirror based on the first target binary value is greater than a second voltage signal output by the drive chip to the motor of the MEMS mirror based on the second target binary value, so that a first electromagnetic torque generated by the motor based on the first voltage signal is greater than a second electromagnetic torque generated by the motor based on the second voltage signal. In this way, a first deflection angle $\beta 1$ of the MEMS mirror based on the first electromagnetic torque is greater than a second deflection angle $\beta 2$ of the MEMS mirror based on the second electromagnetic torque.

Further, a larger maximum deflection angle of the MEMS mirror indicates a larger angle at which a beam emergent from the MEMS mirror is incident to the incoupling area of the optical waveguide, so that an emergent angle of the beam emergent from the outcoupling area of the optical waveguide is larger, and the FOV of the electronic device is larger.

Figure 11A:
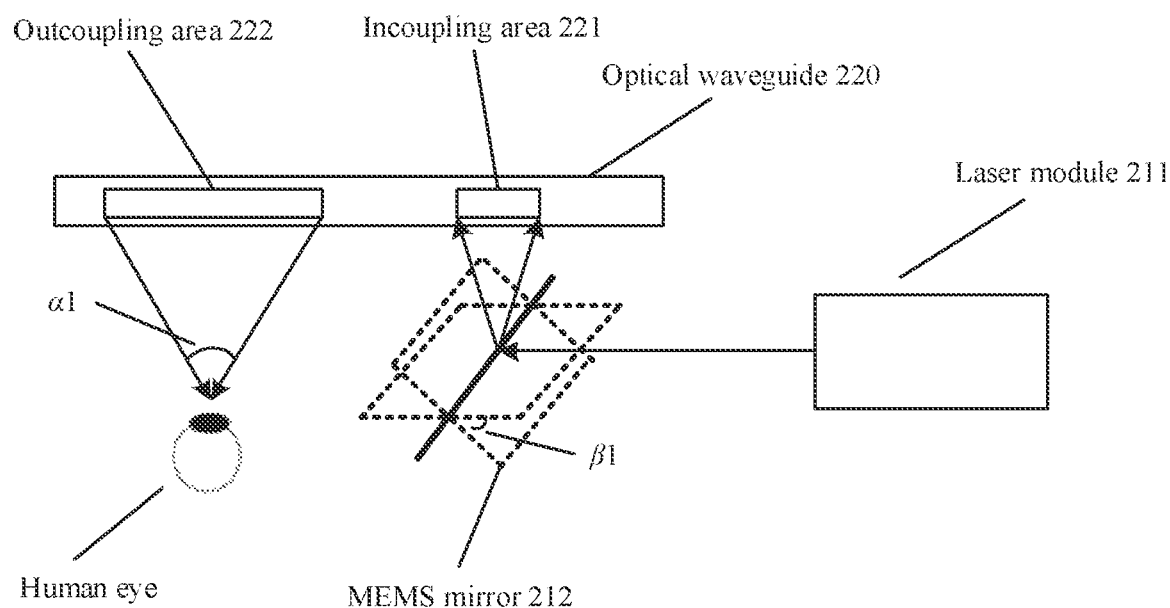
FIG. 11a is a schematic diagram of a beam direction when a physical deflection angle of an MEMS mirror is large according to an embodiment of this application.
Figure 11B:
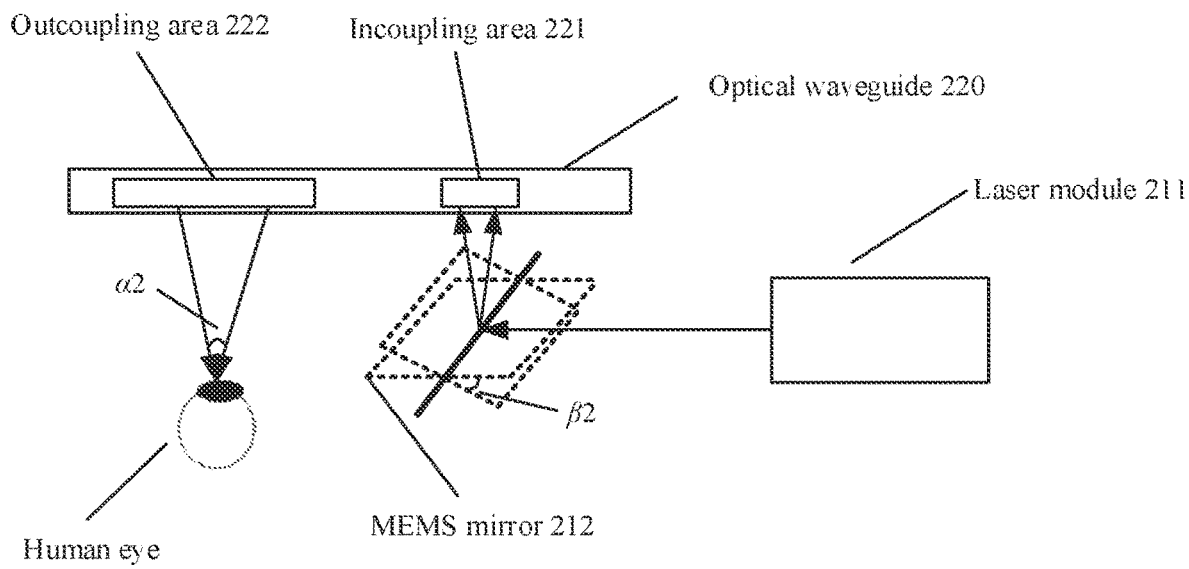
FIG. 11b is a schematic diagram of a beam direction when a physical deflection angle of an MEMS mirror is small according to an embodiment of this application.

When a physical deflection angle of the MEMS mirror is $\beta 1$, a schematic diagram of a beam direction in the optical display module 200 is shown in FIG. 11a. The FOV is denoted as $\alpha 1$. When a physical deflection angle of the MEMS mirror is $\beta 2$, a schematic diagram of a beam direction in the optical display module 200 is shown in FIG. 11b. The FOV is denoted as $\alpha 2$.

It can be learned from FIG. 11a and FIG. 11b that different values are output to the drive chip of the MEMS mirror, so that the drive chip of the MEMS mirror can output voltage signals of different magnitudes, maximum deflection angles $\beta$ of the MEMS mirror can be different, maximum incident angles of beams incident to the incoupling area of the optical waveguide can be different, and maximum emergent angles of beams emergent from the outcoupling area of the optical waveguide can be different, to implement different FOVs.

It can be learned that in the technical solution of this embodiment, the head-mounted electronic device can switch between different FOVs, to meet use requirements for the head-mounted electronic device in different scenarios. For example, in a scenario in which the large FOV is required, an image that meets the requirement is provided for the user. In a scenario in which the large FOV is not required, power consumption can be reduced.

It may be understood that in this embodiment, the MEMS mirror is merely an example of a mirror in the head-mounted electronic device. Correspondingly, adjusting the physical deflection angle of the MEMS mirror by outputting different voltage signals to the MEMS mirror is merely an example. Any implementation of adjusting a maximum physical deflection angle of the mirror by outputting different signals to the mirror in the head-mounted electronic device shall fall within the protection scope of this embodiment.

The following describes another manner of switching the FOV of the head-mounted electronic device in embodiments of this application by using an example in which the head-mounted electronic device includes the optical display module 300 shown in FIG. 3a and FIG. 3b.

The display in the optical display module in this embodiment is a display whose resolution is adjustable. Correspondences between a plurality of FOVs and a plurality of resolutions may be set in a memory of the head-mounted electronic device. Generally, a resolution corresponding to the large FOV is higher than a resolution corresponding to the small FOV.

After determining a target FOV of the head-mounted electronic device, a processor of the head-mounted electronic device may find, based on the correspondences between the FOVs and the resolutions, a target resolution that matches the target FOV, and output a control signal to a control chip of the display in the optical display module. The control signal is used to control a resolution of the display to be adjusted to the target resolution.

For example, when determining that the target FOV is the large FOV, the head-mounted electronic device may find, based on the correspondences between the FOVs and the resolutions, a first resolution corresponding to the large FOV, and output, to the optical display module, a control signal that indicates the first resolution. For another example, when determining that the target FOV is the small FOV, the head-mounted electronic device may find, based on the correspondences between the FOVs and the resolutions, a second resolution corresponding to the small FOV, and output, to the optical display module, a control signal that indicates the second resolution. The first resolution is higher than the second resolution.

After receiving the control signal sent by the processor of the head-mounted electronic device, the control chip of the display in the optical display module adjusts the resolution of the display based on the control signal. When resolutions of the display are different, sizes of active areas (active areas, AA) of the display are different. An AA corresponding to a high resolution is larger than an AA corresponding to a low resolution.

Figure 12A:
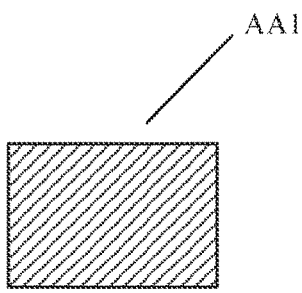
FIG. 12a is a schematic diagram of an AA when a resolution of a display is high according to an embodiment of this application.
Figure 13A:
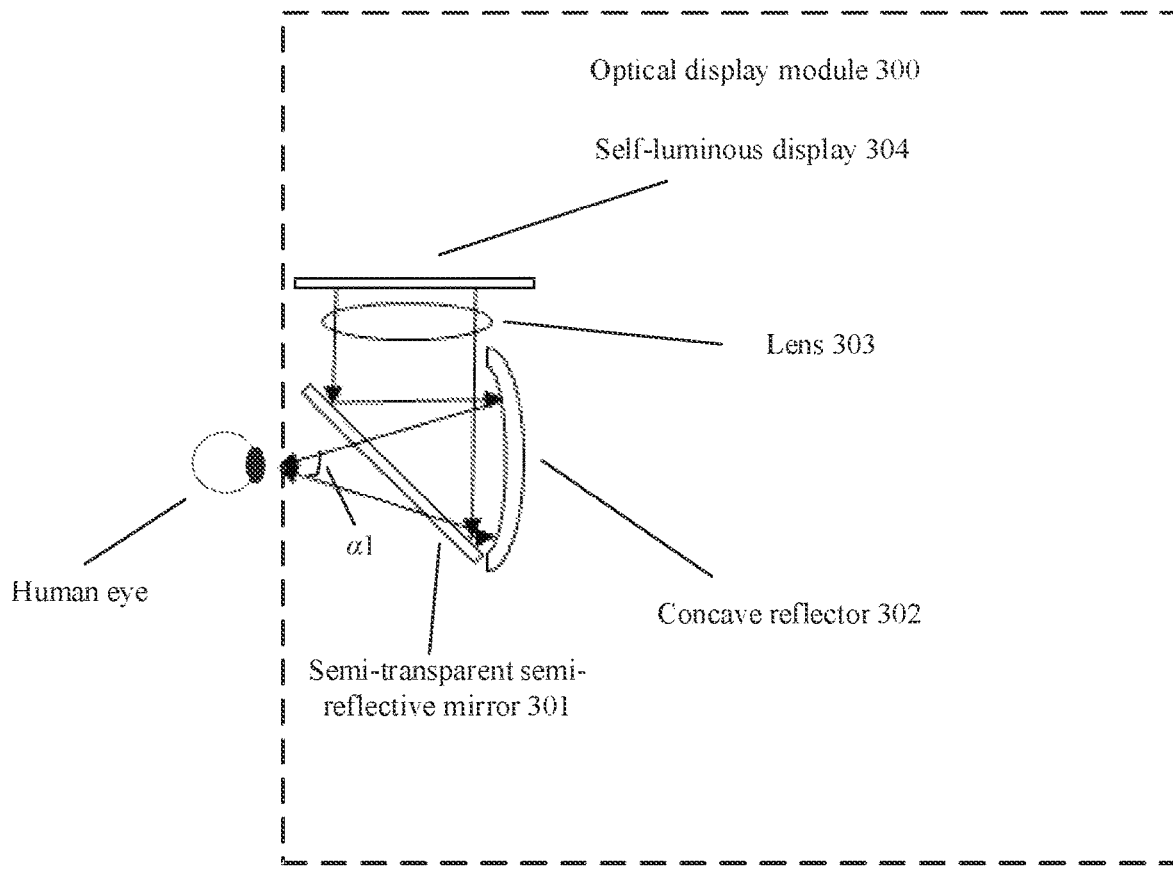
FIG. 13a is a schematic diagram of a beam direction when an optical display module 300 displays a large-FOV image according to an embodiment of this application.
Figure 14A:
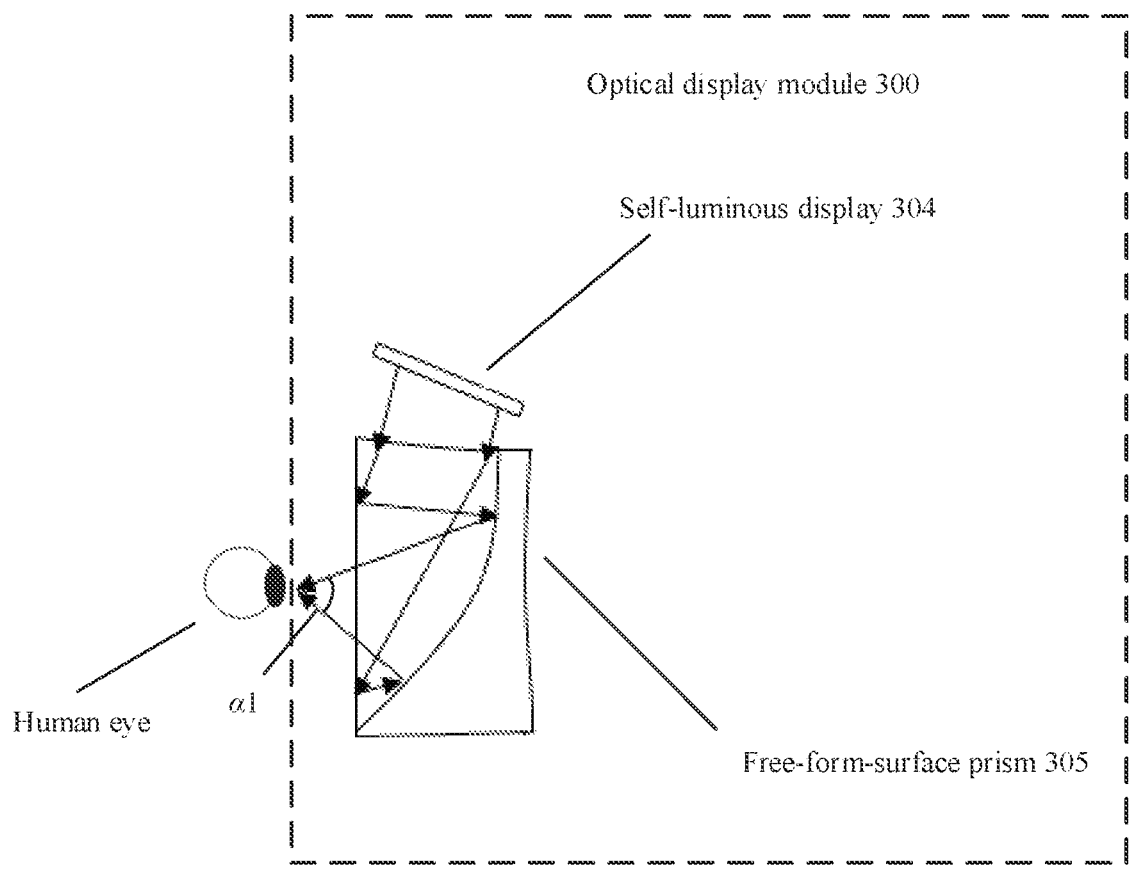
FIG. 14a is a schematic diagram of another beam direction when an optical display module 300 displays a large-FOV image according to an embodiment of this application.

For example, after receiving the control signal that indicates the high first resolution, the control chip of the display adjusts the resolution to the first resolution. In this case, an example of AA1 of the display is shown in FIG. 12a. When the AA of the self-luminous display in the optical display module shown in FIG. 3a is shown in FIG. 12a, a diagram of an optical path of a beam emitted by the self-luminous display in the optical display module is shown in FIG. 13a. The FOV is denoted as al. When the AA of the self-luminous display in the optical display module shown in FIG. 3b is shown in FIG. 12a, a diagram of an optical path of a beam emitted by the self-luminous display in the optical display module is shown in FIG. 14a. The FOV is denoted as $\alpha 2$. $\alpha 1 > \alpha 2$.

Figure 12B:
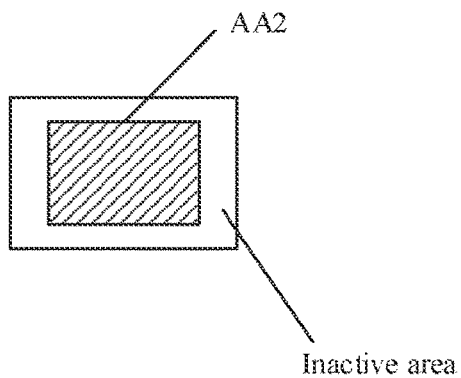
FIG. 12b is a schematic diagram of an AA when a resolution of a display is low according to an embodiment of this application.
Figure 13B:
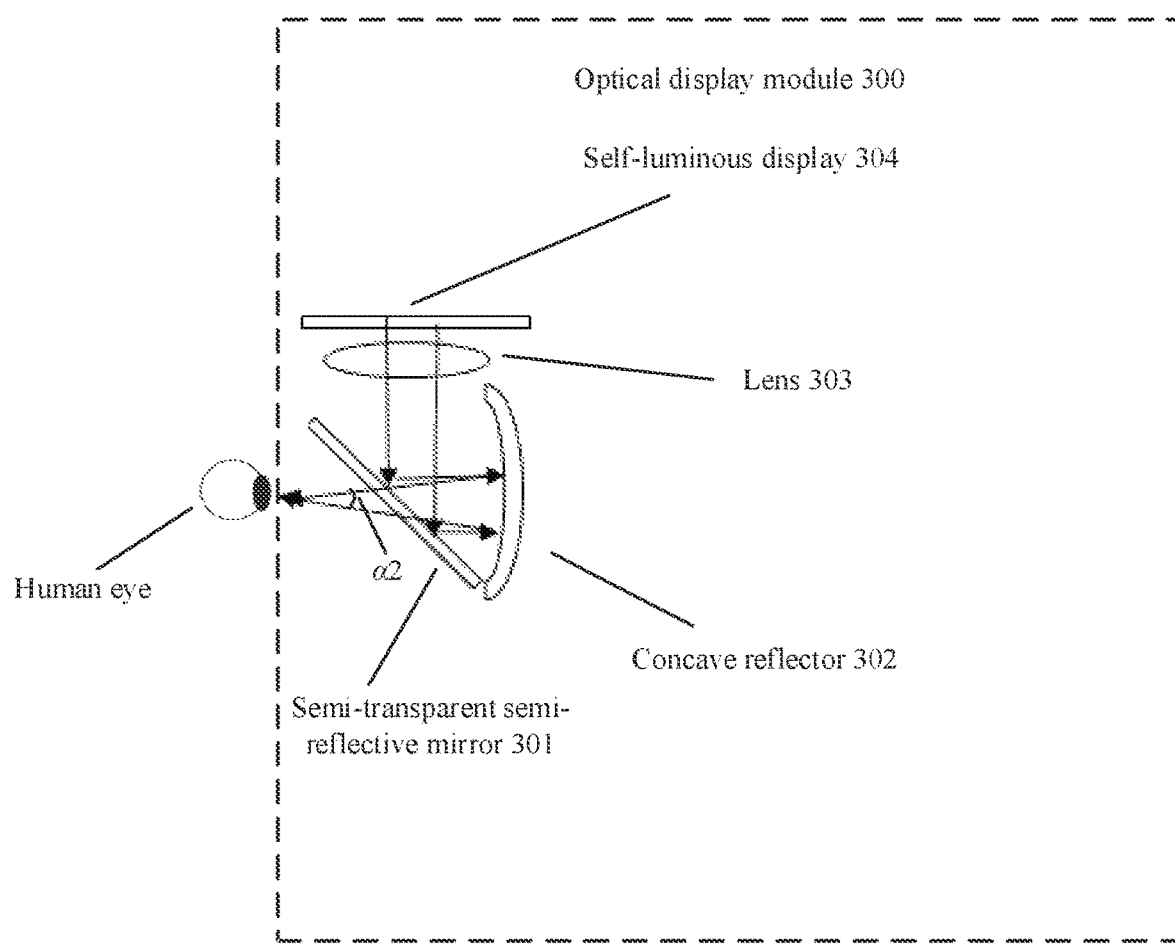
FIG. 13b is a schematic diagram of a beam direction when an optical display module 300 displays a small-FOV image according to an embodiment of this application.
Figure 14B:
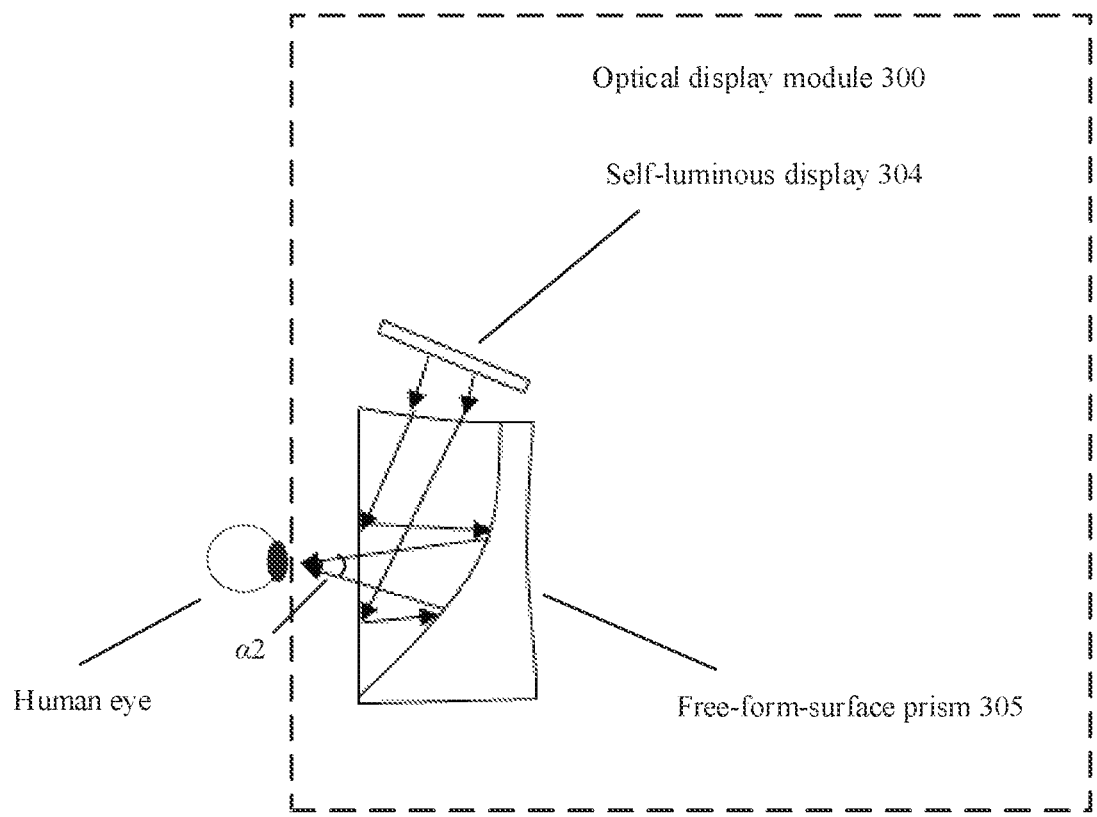
FIG. 14b is a schematic diagram of another beam direction when an optical display module 300 displays a small-FOV image according to an embodiment of this application.

For another example, after receiving the control signal that indicates the low second resolution, the control chip of the display adjusts the resolution to the second resolution. In this case, an example of AA2 of the display is shown in FIG. 12b. AA2 is smaller than AA1. When the AA of the self-luminous display in the optical display module shown in FIG. 3a is shown in FIG. 12b, a diagram of an optical path of a beam emitted by the self-luminous display in the optical display module is shown in FIG. 13b. The FOV is denoted as al. When the AA of the self-luminous display in the optical display module shown in FIG. 3b is shown in FIG. 12a, a diagram of an optical path of a beam emitted by the self-luminous display in the optical display module is shown in FIG. 14b. The FOV is denoted as $\alpha 2$. $\alpha 1 > \alpha 2$.

It can be learned from FIG. 13a and FIG. 14a that w % ben the display adjusts the resolution to the first resolution, the AA of the display is large, an emergent angle of a beam emergent from the display is large, and an emergent angle of the beam after passing through the lens, the concave reflector, and the semi-transparent semi-reflective mirror is large, to implement the large FOV, that is, provide an image with a large visual field for the user.

It can be learned from FIG. 13b and FIG. 14b that when the display adjusts the resolution to the second resolution, the AA of the display is small, an emergent angle of a beam emergent from the display is small, and an emergent angle of the beam after passing through the lens, the concave reflector, and the semi-transparent semi-reflective mirror is small, to implement the small FOV, that is, provide an image with a small visual field for the user.

It can be learned from the foregoing content that in comparison with a fixed resolution of the self-luminous display, because the resolution of the display in this embodiment of this application is adjustable, the head-mounted electronic device can switch between different FOVs. The head-mounted electronic device can switch to the large FOV in a scenario in which the large FOV is required, to meet a user requirement. The head-mounted electronic device can switch to the small FOV in a scenario in which the large FOV is not required, to reduce energy consumption.

In addition, compared with a method for implementing similar FOV switching by inputting an image with a part whose grayscale is 0 to a display, the method in this embodiment does not have a problem that an image is not in an all-black state due to impact such as stray light generated by leakage current in an area whose grayscale is 0, so that a display effect of a head-mounted electronic product when the head-mounted electronic product switches to the small FOV can be improved.

When the optical display module of the head-mounted electronic device is the optical display module 300 shown in FIG. 3b, for a manner of switching the FOV of the head-mounted electronic device, refer to the switching manner in FIG. 3a. Details are not described herein again.

The following describes another manner of switching the FOV of the head-mounted electronic device in embodiments of this application by using an example in which the head-mounted electronic device includes the optical display module 400 shown in FIG. 4.

In an example of this embodiment, the light source of the display is an LED array. Each sub-LED in the array can be separately controlled or separately light up. In this embodiment, correspondences between a plurality of FOVs and a plurality of control modes of the LED array are set in a memory of the head-mounted electronic device. Different FOVs correspond to different control modes of the LED array. In different control modes of the LED array, sizes of areas of light-up sub-LEDs in the LED array are different.

For example, in an LED control mode corresponding to the large FOV, all sub-LEDs may light up, so that a display area of the display is an AA. For another example, in an LED control mode corresponding to the small FOV, some sub-LEDs light up, so that only a part of the display is illuminated, and a partial area of the display is an AA.

In this embodiment, after determining a target FOV of the head-mounted electronic device, a processor of the head-mounted electronic device may find, based on the correspondences between the FOVs and the control modes of the LED array, a target control mode that matches the target FOV, and output a control signal to a control chip of the light source in the optical display module. The control signal is used to control the light source to light up in the target control mode.

For example, when determining that the target FOV is the large FOV, the head-mounted electronic device may find, based on the correspondences between the FOVs and the control modes, a first control mode corresponding to the large FOV, and output, to the optical display module, a control signal that indicates the first control mode. An example of the first control mode is controlling all sub-LEDs to light up. For another example, when determining that the target FOV is the small FOV, the head-mounted electronic device may find, based on the correspondences between the FOVs and the control modes, a second control mode corresponding to the small FOV, and output, to the optical display module, a control signal that indicates the second control mode. An example of the second control mode is controlling sub-LEDs in a middle area of the LED array to light up.

After receiving the control signal sent by the processor of the head-mounted electronic device, the control chip of the LED array in the optical display module lights up corresponding sub-LEDs based on the control signal. When sizes of illuminated areas in the LED array are different, sizes of AAs of the display are different.

Figure 15A:
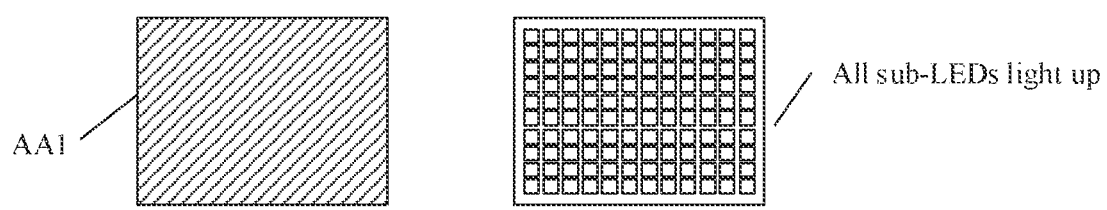
FIG. 15a is a schematic diagram of an LED array and an AA when all sub-LEDs light up according to an embodiment of this application.
Figure 16A:
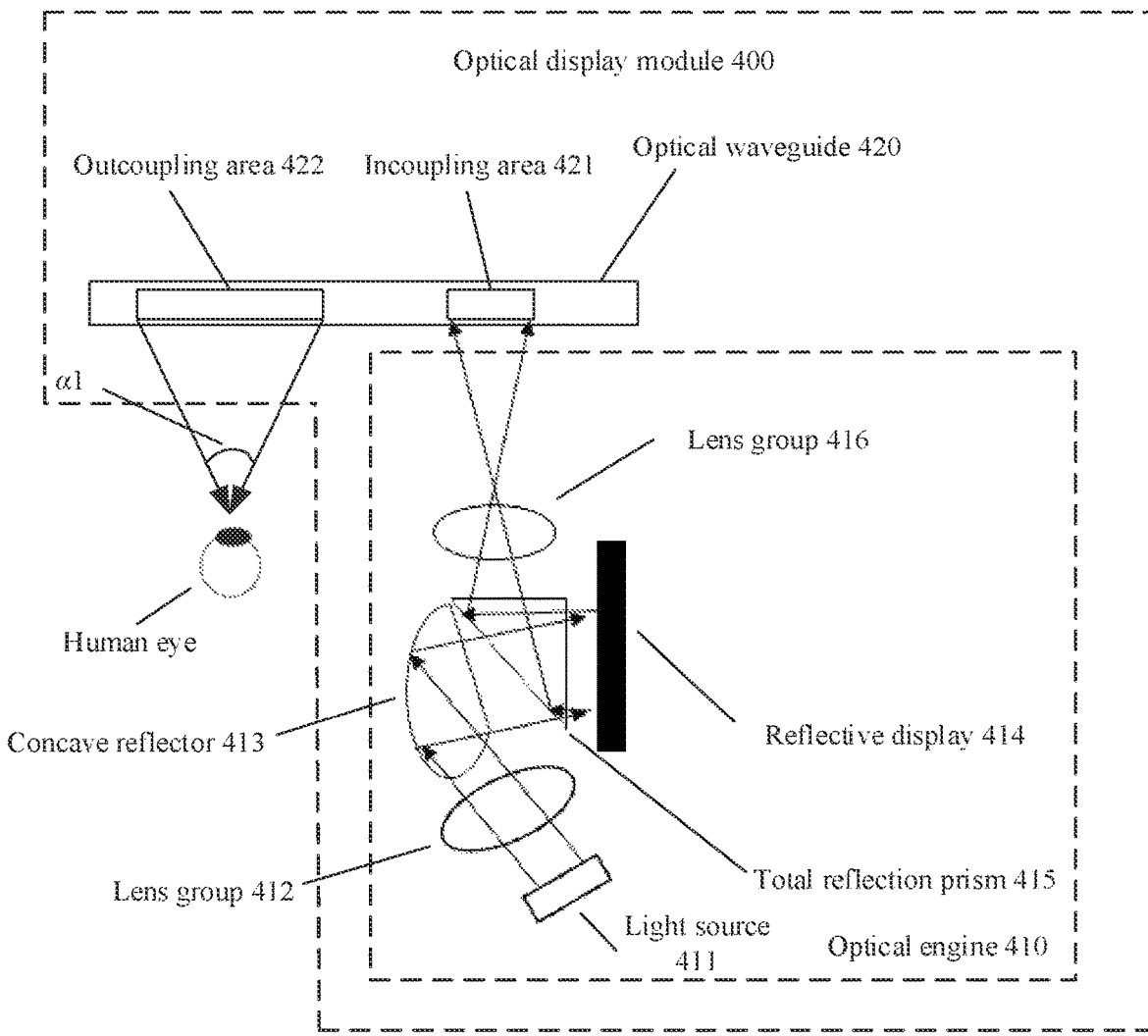
FIG. 16a is a schematic diagram of a beam direction when an optical display module 400 displays a large-FOV image according to an embodiment of this application.

For example, after receiving the control signal that indicates the first control mode, the control chip of the LED array lights up all sub-LEDs. In this case, an example of the LED array and the AA of the display is shown in FIG. 15a. When the light source in the optical display module shown in FIG. 4 and the AA of the display are shown in FIG. 15a, a schematic diagram of an optical path of the optical display module is shown in FIG. 16a. The FOV is denoted as α1.

Figure 15B:
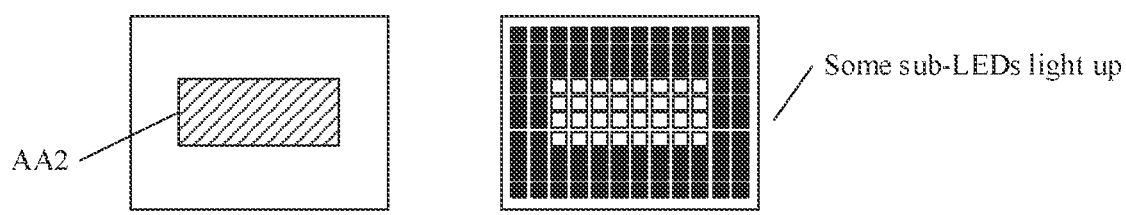
FIG. 15b is a schematic diagram of an LED array and an AA when some sub-LEDs light up according to another embodiment of this application.
Figures 16B, 17:
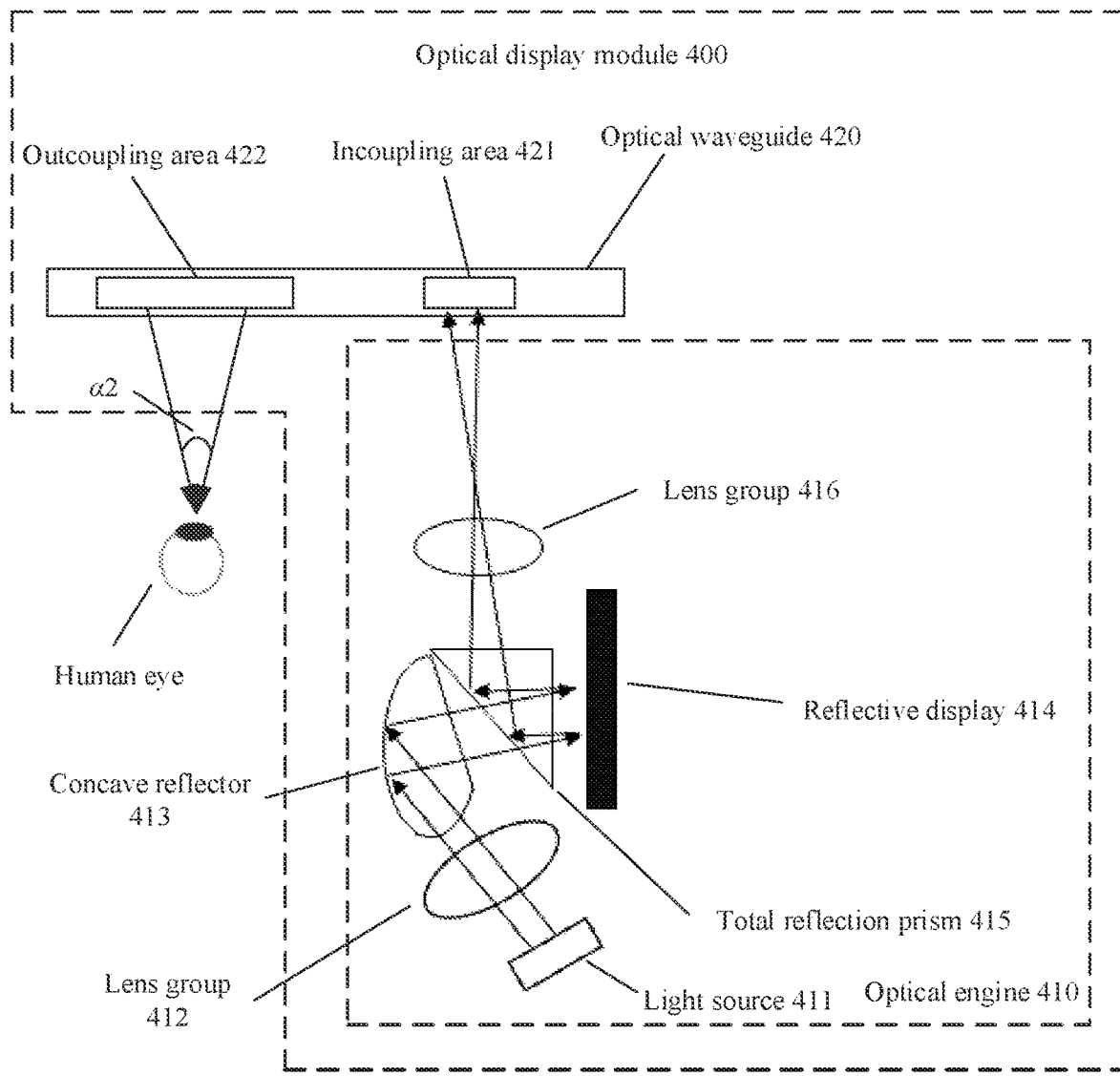
FIG. 16b is a schematic diagram of a beam direction when an optical display module 400 displays a small-FOV image according to an embodiment of this application.
FIG. 17 is a schematic flowchart of an image display method of an electronic device according to an embodiment of this application.

For another example, after receiving the control signal that indicates the second control mode, the control chip of the display lights up some sub-LEDs. In this case, an example of the LED array and the AA of the display is shown in FIG. 15b. When the light source in the optical display module shown in FIG. 4 and the AA of the display are shown in FIG. 15b, a schematic diagram of an optical path of the optical display module is shown in FIG. 16b. The FOV is denoted as α2. α1>α2.

It can be learned from FIG. 13 that AA1 of the display when all sub-LEDs of the LED array light up is larger than AA2 of the display when some sub-LEDs of the LED array light up.

It can be learned from FIG. 16a that when the AA of the display is large, an emergent angle of a beam emergent from the display after passing through various lenses and/or reflectors is large, to implement the large FOV, that is, provide an image with a large visual field for the user. It can be learned from FIG. 16b that when the AA of the display is small, an emergent angle of a beam emergent from the display after passing through various lenses and/or reflectors is small, to implement the small FOV, that is, provide an image with a small visual field for the user.

It can be learned from the foregoing content that in comparison with a fixed control mode of a light source array, that is, in comparison with a fixed illuminated area of the light source array, because an illuminated area of the light source array in this embodiment of this application is adjustable, the head-mounted electronic device can switch between different FOVs. The head-mounted electronic device can switch to the large FOV in a scenario in which the large FOV is required, to meet a user requirement. The head-mounted electronic device can switch to the small FOV in a scenario in which the large FOV is not required, to reduce energy consumption.

It may be understood that in the optical display module including the display, a method for adjusting the FOV of the image by adjusting the resolution of the display or adjusting a light-emitting area of the light source is merely an example. This application further proposes another method. For example, the FOV may be adjusted by adjusting a size of a pixel on the image.

FIG. 17 is a schematic flowchart of an image display method of an electronic device according to an embodiment of this application. The method may include S1710 and S1720.

S1710: Detect whether the electronic device is connected to an external power supply device.

In this embodiment, the external power supply device is a device that can supply power to the electronic device after being connected to the electronic device. The external power supply device may be connected to the electronic device in a wired manner, or may be connected to the electronic device in a wireless manner. This is not limited in this embodiment.

For example, a processor of the electronic device detects whether there is voltage input on an input/output interface of the electronic device. If there is voltage input, it is determined that the electronic device is connected to the external power supply device; otherwise, it is determined that the electronic device is not connected to the external power supply device.

S1720: Display a small-FOV image if the electronic device is not connected to the external power supply device.

For example, when determining that the electronic device is not connected to the external power supply device, the processor of the electronic device determines that a target FOV of the electronic device is a small FOV, and controls a display module to display the small-FOV image. For a manner of displaying the small-FOV image by the electronic device, refer to related content in the foregoing embodiments. Details are not described herein again.

In some implementations, if the electronic device is not connected to the external power supply device, an FOV of an image displayed when a battery level is less than a preset first battery level is less than an FOV of an image displayed when the battery level is greater than or equal to the first battery level.

Figure 18:
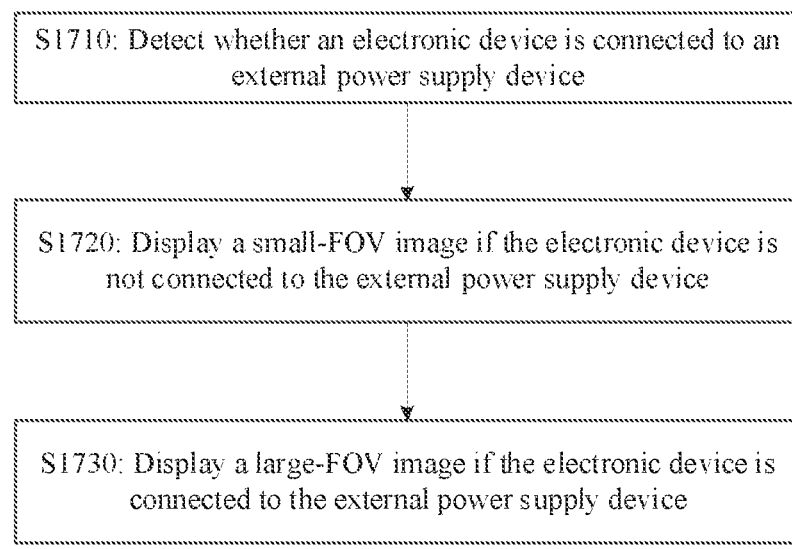
FIG. 18 is a schematic flowchart of an image display method of an electronic device according to another embodiment of this application.

In this embodiment, optionally, as shown in FIG. 18, the method may further include S1730: Display a large-FOV image if the electronic device is connected to the external power supply device. For a manner of displaying the large-FOV image by the electronic device, refer to related content in the foregoing embodiments. Details are not described herein again.

In this embodiment, optionally, the electronic device may further receive an instruction input by a user, and switch the FOV of the image based on the instruction of the user. For example, the electronic device switches from a large FOV to the small FOV based on the instruction of the user, or switches from the small FOV to the large FOV based on the instruction of the user.

In some implementations, the electronic device receives the instruction of the user, and then determines whether an FOV indicated by the instruction of the user is consistent with the current FOV of the electronic device. If the FOV indicated by the instruction of the user is consistent with the current FOV of the electronic device, the electronic device maintains the current FOV. If the FOV indicated by the instruction of the user is inconsistent with the current FOV of the electronic device, the FOV of the electronic device is updated to the FOV indicated by the instruction of the user, and FOV switching is performed based on an updated FOV.

In an example, in a scenario in which the current FOV of the electronic device is the small FOV, the electronic device receives the instruction of the user. If the FOV indicated by the instruction of the user is the large FOV, the FOV of the electronic device is set to the large FOV, and FOV switching is performed.

In another example, in a scenario in which the current FOV of the electronic device is the large FOV, the electronic device receives the instruction of the user. If the FOV indicated by the instruction of the user is the small FOV, the FOV of the electronic device is set to the small FOV, and FOV switching is performed.

In a third example, in a scenario in which the current FOV of the electronic device is the small FOV, the electronic device receives the instruction of the user. If the FOV indicated by the instruction of the user is the small FOV, the electronic device continues to maintain the small FOV. In this example, the electronic device may not perform FOV switching.

In a fourth example, in a scenario in which the current FOV of the electronic device is the large FOV, the electronic device receives the instruction of the user. If the FOV indicated by the instruction of the user is the large FOV, the electronic device continues to maintain the large FOV. In this example, the electronic device may not perform FOV switching.

In this embodiment, optionally, the electronic device may provide an FOV setting button and/or an FOV setting page for the user; or the electronic device provides an FOV setting page for the user through a terminal device that performs data connection with the electronic device.

In this embodiment, optionally, the electronic device may receive an instruction input by the user, and set, based on the instruction, whether an FOV displayed when the electronic device is connected to the external power supply device is the large FOV or the small FOV; or set, based on the instruction, whether an FOV displayed when the electronic device is not connected to the external power supply device is the large FOV or the small FOV.

In this embodiment, optionally, the electronic device may periodically detect whether the electronic device is connected to the external power supply device, and perform a corresponding operation based on a detection result.

Figure 19:
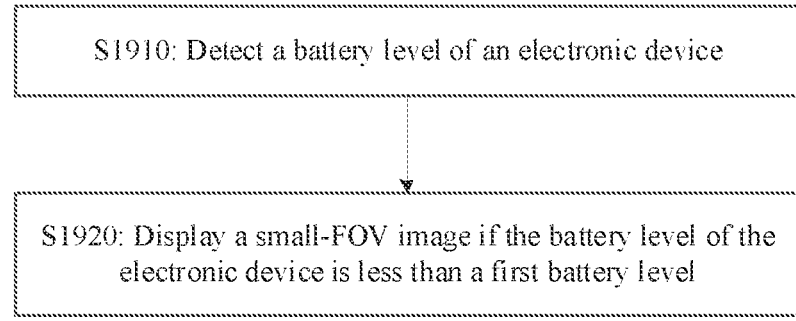
FIG. 19 is a schematic flowchart of an image display method of an electronic device according to another embodiment of this application.

FIG. 19 is a schematic flowchart of an image display method of an electronic device according to another embodiment of this application. The method may include S1910 and S1920.

S1910: Detect a battery level of the electronic device.

S1920: Display a small-FOV image if the battery level of the electronic device is less than a first battery level.

For a manner of displaying the small-FOV image by the electronic device, refer to related content in the foregoing embodiments. Details are not described herein again.

In this embodiment, optionally, a large-FOV image is displayed if the battery level of the electronic device is greater than or equal to the first battery level. For a manner of displaying the large-FOV image by the electronic device, refer to related content in the foregoing embodiments. Details are not described herein again.

In some implementations, if the battery level of the electronic device is less than the preset first battery level, an FOV of an image displayed when the electronic device is not connected to the external power supply device is less than an FOV of an image displayed when the electronic device is connected to the external power supply device.

In this embodiment, optionally, the electronic device may further receive an instruction input by a user, and switch the FOV of the image based on the instruction of the user. For a manner in which the electronic device performs FOV switching in this embodiment, refer to related content in the embodiment shown in FIG. 15. Details are not described herein again.

In this embodiment, optionally, the electronic device may receive an instruction input by the user, and set the first battery level based on the instruction.

In this embodiment, optionally, the electronic device may periodically detect the battery level of the electronic device, and perform a corresponding operation based on a detection result.

It may be understood that displaying the large-FOV image and the small-FOV image by the electronic device in embodiments of this application is merely an example. In any embodiment of this application, the electronic device may further display images of one or more FOVs between a large FOV and a small FOV.

All or some of the foregoing embodiments may be implemented by using software, hardware, firmware, or any other combination thereof. When the software is used to implement the embodiments, all or some of the foregoing embodiments may be implemented in a form of a computer program product. The computer program product includes one or more computer instructions or computer programs. When the computer instructions or the computer programs are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, microwave, or the like) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes an association relationship between associated objects and represents that three relationships may exist. For example, A and/or B may represent the following three cases; only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application. "at least one" means one or more, and "a plurality of" means two or more. "At least one of the following items (pieces)" or a similar expression thereof refers to any combination of these items, including any combination of singular items (pieces) or plural items (pieces). For example, at least one item (piece) of a, b, or c may indicate a, b, c, a and b, a and c, b and c, or a, b, and c, where a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are examples. For example, division into the units is logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may be or may not be physically separate, and parts displayed as units may be or may not be physical units, may be located in one position, or may be distributed on a plurality of network units. Some or all of the units may be selected based on actual requirements to achieve the objectives of the solutions in the embodiments.

In addition, functional units in embodiments of this application may be integrated into one processing unit, each of the units may exist alone physically, or two or more units are integrated into one unit.

If implemented in a form of a software functional unit and sold or used as a standalone product, functions may be stored in a computer-readable storage medium. Based on such an understanding, the technical solutions in this application essentially, or the part making contributions, or some of the technical solutions may be implemented in a form of a software product. The computer software product is stored in a storage medium, and includes instructions for instructing a computer device (which may be a personal computer, a server, a network device, or the like) to perform all or some of the steps of the methods described in embodiments of this application. The storage medium includes any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method applied to an electronic device and comprising:
   displaying a first image of a first fields of view (FOV) when the electronic device is not connected to an external power supply device and when a battery level of the electronic device is greater than or equal to a first battery level;
   displaying a second image of a second FOV when the electronic device is connected to the external power supply device, wherein the second FOV is greater than or equal to the first FOV; and
   displaying a third image of a third FOV when the electronic device is not connected to the external power supply device and when the battery level of the electronic device is less than the first battery level, wherein the third FOV is less than the first FOV.

2. The method of claim 1, wherein the electronic device comprises an optical display module, wherein the optical display module comprises a laser beam scanning (LBS) optical engine comprising a micro-electro-mechanical system (MEMS) mirror, and wherein the method further comprises:
   displaying the third image when a maximum deflection angle of the MEMS mirror during vibrational rotation is a first angle; and
   displaying the first image or the second image when the maximum deflection angle of the MEMS mirror during the vibrational rotation is a second angle, wherein the first angle is less than the second angle.

3. The method of claim 2, wherein the optical display module further comprises a laser module, wherein the LBS optical engine further comprises an optical waveguide comprising an incoupling area and an outcoupling area, and wherein the method further comprises:
   emitting, by the laser module, a beam to the MEMS mirror;
   making, by the MEMS mirror, the beam incident, and then emergent and incident to the incoupling area through vibrational rotation; and
   transmitting, by the optical waveguide to the outcoupling area, the beam incident to the incoupling area.

4. The method of claim 2, further comprising outputting, by a drive chip of the electronic device, a voltage signal to the MEMS mirror, wherein when the voltage signal is a first voltage signal, the maximum deflection angle is the first angle, wherein when the voltage signal is a second voltage signal, the maximum deflection angle is the second angle, and wherein the first voltage signal is less than the second voltage signal.

5. The method of claim 1, wherein the electronic device comprises an optical display module comprising a display component, and wherein the method further comprises:
   displaying the third image when an active area of the display component is a first area; and
   displaying the first image or the second image when the active area of the display component is a second area, wherein the first area is smaller than the second area.

6. The method of claim 5, wherein the display component is a self-luminous display, wherein when a resolution of the self-luminous display is adjusted to a first resolution, the active area of the self-luminous display is the first area, wherein when the resolution of the self-luminous display is adjusted to a second resolution, the active area of the display component is the second area, and wherein the first resolution is lower than the second resolution.

7. The method of claim 6, wherein the optical display module further comprises a first mirror group comprising one or more mirrors, and wherein the method further comprises making, by the first mirror group, a beam emitted by the active area incident and then emergent.

8. The method of claim 5, wherein the display component comprises a reflective display, wherein the optical display module further comprises a light source, wherein the method further comprises reflecting, by the reflective display, light emitted by the light source, wherein when a light-emitting area of the light source is adjusted to a first light-emitting area, the active area is the first area, wherein when the light-emitting area of the light source is adjusted to a second light-emitting area, the active area is the second area, and wherein the second light-emitting area is larger than the first light-emitting area.

9. The method of claim 8, wherein the optical display module further comprises a first mirror group, a second mirror group, and an optical waveguide comprising an incoupling area and an outcoupling area, and wherein the method further comprises:
   making, by the first mirror group, a beam emitted by the light source incident, and then emergent and incident to the reflective display;
   making, by the second mirror group, the beam incident to the reflective display incident, and then emergent and incident to the incoupling area; and
   transmitting, by the optical waveguide to the outcoupling area, the beam incident to the incoupling area.

10. An electronic device comprising:
    one or more memories configured to store instructions; and
    one or more processors coupled to the one or more memories and configured to execute the instructions to cause the electronic device to:
       display a first image of a first field of view (FOV) when the electronic device is not connected to an external power supply device and when a battery level of the electronic device is greater than or equal to a first battery level;
       display a second image of a second FOV when the electronic device is connected to the external power supply device, wherein the second FOV is greater than or equal to the first FOV; and
       display a third image of a third FOV when the electronic device is not connected to the external power supply device and when the battery level is less than the first battery level, wherein the third FOV is less than the first FOV.

11. The electronic device of claim 10, further comprising an optical display module comprising a laser beam scanning (LBS) optical engine comprising a micro-electro-mechanical system (MEMS) mirror, and wherein the one or more processors are further configured to execute the instructions to cause the electronic device to:
    display the third image when a maximum deflection angle of the MEMS mirror during vibrational rotation is a first angle; and
    display the first image or the second image when the maximum deflection angle of the MEMS mirror during the vibrational rotation is a second angle, wherein the first angle is less than the second angle.

12. The electronic device of claim 11, wherein the optical display module further comprises a laser module, wherein the LBS optical engine further comprises an optical waveguide comprising an incoupling area and an outcoupling area, wherein the laser module is configured to emit a beam to the MEMS mirror, wherein the MEMS mirror is configured to make the beam emitted by the laser module incident, and then emergent and incident to the incoupling area through vibrational rotation, and wherein the optical waveguide is configured to transmit, to the outcoupling area, the beam incident to the incoupling area.

13. The electronic device of claim 11, further comprising a drive chip configured to output a voltage signal to the MEMS mirror, wherein when the voltage signal is a first voltage signal, the maximum deflection angle is the first angle, wherein when the voltage signal is a second voltage signal, the maximum deflection angle is adjusted to the second angle, and wherein the first voltage signal is less than the second voltage signal.

14. The electronic device of claim 10, wherein the electronic device comprises an optical display module, wherein the optical display module comprises a display component, and wherein the one or more processors are further configured to execute the instructions to cause the electronic device to:
    display the third image when an active area of the display component is a first area; and
    display the first image or the second image when the active area of the display component is a second area, wherein the first area is smaller than the second area.

15. The electronic device of claim 14, wherein the display component is a self-luminous display, wherein when a resolution of the self-luminous display is adjusted to a first resolution, the active area of the self-luminous display is the first area, wherein when the resolution of the self-luminous display is adjusted to a second resolution, the active area of the display component is the second area, and wherein the first resolution is lower than the second resolution.

16. A head-mounted display device comprising:
    one or more memories configured to store instructions; and
    one or more processors coupled to the one or more memories and configured to execute the instructions to cause the head-mounted display device to:
        display a first image of a first field of view (FOV) when the head-mounted display device is not connected to an external power supply device and when a battery level of the head-mounted display device is greater than or equal to a first battery level;
        display a second image of a second FOV when the head-mounted display device is connected to the external power supply device, wherein the second FOV is greater than or equal to the first FOV; and
        display a third image of a third FOV when the head-mounted display device is not connected to the external power supply device and when the battery level is less than the first battery level, wherein the third FOV is less than the first FOV, and
    wherein the images are virtual images.

17. The head-mounted display device of claim 16, further comprising an optical display module comprising a laser beam scanning (LBS) optical engine comprising a microelectro-mechanical system (MEMS) mirror, and wherein the one or more processors are further configured to execute the instructions to cause the head-mounted display device to:
    display the third image when a maximum deflection angle of the MEMS mirror during vibrational rotation is a first angle; and
    display the first image or the second image when the maximum deflection angle of the MEMS mirror during the vibrational rotation is a second angle, wherein the first angle is less than the second angle.

18. The head-mounted display device of claim 17, wherein the optical display module further comprises a laser module, wherein the LBS optical engine further comprises an optical waveguide comprising an incoupling area and an outcoupling area, wherein the laser module is configured to emit a beam to the MEMS mirror, wherein the MEMS mirror is configured to make the beam emitted by the laser module incident, and then emergent and incident to the incoupling area through vibrational rotation, and wherein the optical waveguide is configured to transmit, to the outcoupling area, the beam incident to the incoupling area.

19. The head-mounted display device of claim 17, further comprising a drive chip configured to output a voltage signal to the MEMS mirror, wherein when the voltage signal is a first voltage signal, the maximum deflection angle is the first angle, wherein when the voltage signal is a second voltage signal, the maximum deflection angle is adjusted to the second angle, and wherein the first voltage signal is less than the second voltage signal.

20. The head-mounted display device of claim 16, wherein the head-mounted display device comprises an optical display module, wherein the optical display module comprises a display component, and wherein the one or more processors are further configured to execute the instructions to cause the head-mounted display device to:
    display the third image when an active area of the display component is a first area; and
    display the first image or the second image when the active area of the display component is a second area, wherein the first area is smaller than the second area,
    wherein the display component is a self-luminous display, wherein when a resolution of the self-luminous display is adjusted to a first resolution, the active area of the self-luminous display is the first area, wherein when the resolution of the self-luminous display is adjusted to a second resolution, the active area of the display component is the second area, and
    wherein the first resolution is lower than the second resolution.

* * * * *